(12) United States Patent
Mousseau et al.

(10) Patent No.: US 11,734,395 B2
(45) Date of Patent: *Aug. 22, 2023

(54) SYSTEMS, DEVICES AND METHODS FOR PROTECTING 3D RENDERED DESIGNS

(71) Applicant: 3D BRIDGE SOLUTIONS INC., Vancouver (CA)

(72) Inventors: Gary Mousseau, Waterloo (CA); Karima Bawa, Vancouver (CA)

(73) Assignee: 3D BRIDGE SOLUTIONS INC., Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,714

(22) Filed: Jun. 23, 2022

(65) Prior Publication Data

US 2022/0327142 A1 Oct. 13, 2022

Related U.S. Application Data

(63) Continuation of application No. 16/031,416, filed on Jul. 10, 2018, now Pat. No. 11,403,408.

(60) Provisional application No. 62/530,477, filed on Jul. 10, 2017.

(51) Int. Cl.
| | |
|---|---|
| *G06F 21/10* | (2013.01) |
| *G06F 21/62* | (2013.01) |
| *G06F 16/27* | (2019.01) |
| *G06F 21/84* | (2013.01) |
| *G06F 30/00* | (2020.01) |

(52) U.S. Cl.
CPC ............ *G06F 21/105* (2013.01); *G06F 16/27* (2019.01); *G06F 21/10* (2013.01); *G06F 21/6209* (2013.01); *G06F 21/84* (2013.01); *G06F 30/00* (2020.01)

(58) Field of Classification Search
CPC ........ G06F 16/27; G06F 21/105; G06F 21/10; G06F 21/6209; G06F 21/84; G06F 30/00
See application file for complete search history.

(56) References Cited

U.S. PATENT DOCUMENTS

| | | |
|---|---|---|
| 6,337,745 B1 | 1/2002 | Aiello, Jr. et al. |
| 7,296,157 B2 | 11/2007 | Partelow et al. |
| 7,664,956 B2 | 2/2010 | Goodman |
| 8,140,847 B1 | 3/2012 | Wu |
| 8,245,306 B2 | 8/2012 | Gimenez |
| 8,937,732 B2 | 1/2015 | Jang et al. |
| 9,110,608 B2 | 8/2015 | Schultz et al. |
| 9,595,037 B2 | 3/2017 | Glasgow et al. |
| 9,858,360 B2 * | 1/2018 | Nelson ................. G06F 3/1222 |
| 10,006,225 B2 | 6/2018 | Muchna et al. |
| 10,063,529 B2 * | 8/2018 | Milazzo ............. H04L 63/0435 |
| 10,839,051 B2 | 11/2020 | Posillico et al. |
| 11,107,168 B2 * | 8/2021 | Small ................. G06Q 10/0833 |

(Continued)

*Primary Examiner* — Irete F Ehichioya
*Assistant Examiner* — Huen Wong
(74) *Attorney, Agent, or Firm* — Norton Rose Fulbright Canada LLP; Maya Medeiros

(57) ABSTRACT

A system and method for providing a secure and auditable means for exchanging files related to 3D objects intended for replication is provided. A secure system and method to facilitate the acquisition of files (such as 3D design files) that can involve intellectual property rights management, standard of quality assurance for 3D printed objects, warranty protection for the printed object, and audit and report tools for the results of a 3D replication.

20 Claims, 9 Drawing Sheets

(56) References Cited

U.S. PATENT DOCUMENTS

| | | | |
|---|---|---|---|
| 2002/0064759 A1* | 5/2002 | Durbin | A61C 9/00 433/213 |
| 2005/0149950 A1 | 7/2005 | Shikata | |
| 2006/0159260 A1 | 7/2006 | Pereira et al. | |
| 2007/0189718 A1 | 8/2007 | Kobayashi et al. | |
| 2007/0273925 A1* | 11/2007 | Hong | G06F 3/1204 358/1.15 |
| 2008/0209323 A1 | 8/2008 | Park | |
| 2013/0305057 A1 | 11/2013 | Greco et al. | |
| 2013/0346740 A1* | 12/2013 | Mirashrafi | G06F 21/84 713/155 |
| 2014/0156053 A1* | 6/2014 | Mahdavi | B33Y 50/02 700/119 |
| 2014/0281477 A1 | 9/2014 | Nayshtut et al. | |
| 2015/0131126 A1* | 5/2015 | Daniels | G06F 3/122 358/1.15 |
| 2015/0134955 A1 | 5/2015 | Lacaze et al. | |
| 2015/0253761 A1* | 9/2015 | Nelson | G06F 21/608 700/98 |
| 2016/0167305 A1* | 6/2016 | Pak | G06F 30/00 700/98 |
| 2016/0167310 A1* | 6/2016 | Lee | B29C 64/386 700/98 |
| 2016/0229123 A1* | 8/2016 | Carlson | B33Y 50/02 |
| 2016/0337325 A1 | 11/2016 | Blomqvist | |
| 2016/0364553 A1 | 12/2016 | Smith et al. | |
| 2017/0041296 A1 | 2/2017 | Ford et al. | |
| 2018/0075167 A1* | 3/2018 | Nelson | G06F 3/1255 |
| 2018/0241567 A1* | 8/2018 | Walling-McGarity | H04N 21/2541 |
| 2019/0121989 A1 | 4/2019 | Mousseau et al. | |
| 2020/0014545 A1* | 1/2020 | Lacaze | H04L 9/3247 |
| 2020/0151778 A1* | 5/2020 | Nakamura | B29C 64/386 |
| 2021/0224361 A1* | 7/2021 | Veldsman | B33Y 50/02 |

* cited by examiner

| 3D Replication Software – Version 1.X | Associate | Input | Values | Select |
|---|---|---|---|---|
| Authorized 3D Replication System Established – ✓ | 3D Replication Machines Found: 2 | | | |
| – Stage one Authorization Complete - | 1. MakerBot – Online, Status: Ready | | | |
| | 2. MoJo – Online, Status: Busy | | | |

3D Replication Key 1 Input - ABF37DGFA6    Licensor Location: www.xyz.com
3D Replication Key 2 Input -                                Licensor Location: www.3Dimages4sale.com

REPLICATION KEY 1

3D Object Files Found:                                                                                              REQ:
⋀  Nike Shoe Style: ABC     (Sole)    .3DS    - Autodesk 3DS Max – Version 3.2 or later
⋀  Nike Shoe Style: ABC     (Sole)    .BLEN   - Blender version 2.8 or later
⋀  Nike Shoe Style: ABC     (High Top) .STL    - 3D Slicer – 3DPrinterOS, Cura or IceSL
⋀  Nike Shoe Style: ABC     (Low Top) .M3F    - Slic3r, SliceCraft (Advanced Users)                      ✓
⋀  Nike Shoe Style: ABC     (Tread)   .GCODE  - 3D Printer: MakerBot Replica, Model: Z18                 ✓
⋀  Nike Shoe Style: ABC     (Tread)   .GCODE  - 3D Printer: ProJet HD – 3500 Max                         √

STATUS MESSAGES
Attach 3D Printer of type MakerBot – Advanced ABC model
.BLEN File Request : Blender Version too old, update needed
.M3F File Request: SliceCraft Opened File Successfully
.GCODE File Request: MakerBot Characteristics Being Tested
(please stand by for final okay before replication begins)

FIGURE 5

SYSTEMS, DEVICES AND METHODS FOR PROTECTING 3D RENDERED DESIGNS

FIELD

Embodiments relate to 3D objects and systems that perform activities on 3D objects including modification and replication of digital files to create physical items.

INTRODUCTION 3D objects can be represented by one or more electronic files. 3D systems can use these one or more electronic files to allow for manipulation of the files and replication of physical objects. 3D systems include computer systems, such as Computer-Aided Design (CAD) systems, to generate designs and modify designs and replication systems, such as 3D printers, to print one or more elements of the 3D object to recreate the 3D object physically. There is a need for methods to protect any given 3D object and the associated 3D related files to help protect the intellectual property rights of the owner, for example.

Protection of intellectual property rights can take the form of a license granted by the owner of the subject system. Complex computer technology and software systems can require a correspondingly complex licensing arrangement.

3D systems can include 3D replication systems and 3D modification systems. 3D replication systems can include 3D printers, CNC machines and laser cutters. 3D replication systems can reproduce increasingly sophisticated objects with multiple interrelated parts from a variety of materials, including plastic, metal, rubber, wood, foam, silica and even human cells.

There is a need to have a secure method of exchanging 3D object files that can safeguard intellectual property rights or at least an alternative. There is a need for a secure method of exchanging 3D object files that can ensure both the quality and integrity of the 3D printed object or at least an alternative. For example, when printing human cells into organs there is an urgency to confirm that a replicated 3D object will perform as required or desired, and that the replica has the quality and integrity of the original. As another example, when printing components for a machine or medical device there may be a need for a warranty, and the like.

3D modification systems for computer-aided design (CAD) can include hardware components and software. 3D modification systems can be used to originate designs (to be stored as electronic files or 3D objects files), generate modifications, manipulations, or customizations to 3D objects (e.g. using the electronic files or 3D objects files).

The secure exchange of files can involve encryption. Encryption technology such as Secure Socket Layer (SSL) can be used to secure financial transactions, for example. SSL could be used to deliver a 3D object files between two parties, but can have shortcomings. Digital Rights Management (DRM) solutions can be used to prevent illegal copying of files. But these systems might not work as intended and can even result in an increase in illegal use. Systems like SSL and DRM might not limit the number of copies that could be made of a 3D object and might not track what happens to files once downloaded.

There can be differences between a digital file used in a 3D replication system to generate physical objects and one used solely in the digital environment. A 3D replication system can use 3D design files to generate physical objects and existing systems might not allow the rights holder to verify that the 3D replication system has the capabilities to enable the perfect reproduction of the intended 3D object. Example issues for replication systems include checking if the correct material loaded is into the printer heads and if there enough material to complete the replication. These verification measures can be important where the reproduced 3D object is sold to a third party since the rights holder may want to confirm that the quality and accuracy of the replicated 3D object matches legal claims of product quality, safety and reliability, for example.

SUMMARY

In an aspect, there is provided an authorized 3D replication system with a data storage device storing 3D replication software connected in real-time to a licensor device having 3D objects. The authorized 3D replication system has a processor configured to: establish and maintain a communication path to the licensor device; validate a 3D replication key that corresponds to 3D objects using the communication path; list a set of the 3D object files for the 3D objects corresponding to the validated 3D replication key; verify capabilities of requesting 3D replication components for replication of a selected one or more 3D object files of the set of the 3D object files according to a replication process; permit access to the selected one or more 3D object files of the set of the 3D object files; and transmit real-time feedback commands to the licensor system related to activity on the selected one or more 3D object files and the replication process by the requesting 3D replication components.

In some embodiments, the processor is further configured to validate a licensee's computing environment for compatibility through the established communication path prior to listing the set of 3D object files.

In some embodiments, the processor is further configured to verify a set of primary capabilities received by the licensor device.

In some embodiments, the processor is further configured to list the set of 3D object files upon verifying a set of capabilities for the 3D objects.

In some embodiments, the processor is further configured create one or more customizations to the selected one or more 3D object files and initiate the replication process of the one or more customizations to the selected one or more 3D object files to create a customized 3D object.

In some embodiments, the processor is further configured to link the one or more 3D replication machines providing the requested 3D replication components to create an authorized 3D replication system for replication of the one or more 3D object files.

In some embodiments, the 3D replication key is an unreadable digital value.

In some embodiments, the 3D replication key provides an out-of-band encryption key to create a symmetrical session key for a communication exchange.

In some embodiments, the processor is further configured to receive a final authorization that there are remaining copies of the one or more 3D object files available for replication.

In some embodiments, the processor is further configured to verify the capabilities by determining that the requesting 3D replication components have a type and an amount of material for the replication process.

In some embodiments, the processor is further configured to access the one or more 3D object files via the download of an encryption key to decrypt the one or more encrypted 3D object files to obtain the original one or more 3D object files.

In an aspect, embodiments described herein provide an authorized 3D replication system having 3D replication software connected real-time to a licensor system of 3D objects.

The system has a processor configured to: establish and maintain a communication path to the licensor system; validate a 3D replication key that corresponds to 3D objects; list a set of the 3D object files for the 3D objects corresponding to the validated 3D replication key; verify capabilities of requesting 3D replication components for replication of a selected one or more 3D object files of the set of the 3D object files; permit access to the selected one or more 3D object files of the set of the 3D object files; and transmit real-time feedback commands to the licensor system related to activity and any modification and manipulation on the selected one or more 3D object files and replication process by the requesting 3D replication components.

In some embodiments, the processor is further configured to validate a licensee's computing environment for compatibility through the established communication path prior to listing the set of 3D object files.

In an aspect, embodiments described herein provide a client device for an authorized 3D replication system comprising 3D replication software connected real-time to a licensor system of 3D objects. The device has a processor configured to: establish and maintain a communication path to the licensor system; transmit a 3D replication key that corresponds to 3D object files; list a set of the 3D object files corresponding to the validated 3D replication key; access a selected one or more 3D object files of the set of the 3D object files; and establish a communication path to requesting 3D replication components for replication of the selected one or more 3D object files of the set of the 3D object files; and initiate a replication process of the selected one or more 3D object files by providing access to the selected one or more 3D object files to the requesting 3D replication components.

In some embodiments, the processor is further configured install 3D replication software and link the software to the one or more 3D replication machines to create an authorized 3D replication system.

In some embodiments, the processor is further configured create one or more customizations to the selected one or more 3D object files and initiate the replication process of the one or more customizations to the selected one or more 3D object files to create a customized 3D object.

In an aspect, embodiments described herein provide a system to securely access to one or more 3D object files for the purposes of replication using an authorized 3D replication system. The system has a processor configured to: validate a 3D replication key that corresponds with 3D object files to initiate 3D object file access; establish and maintain a communication path to a licensor system; permit downloading of one or more 3D object files corresponding to the validated 3D replication key; determine requirements for replication of the one or more 3D object files and verifying capabilities of requesting 3D replication components based on the requirements; and provide real-time feedback from the authorized 3D replication system to the licensor related to any activity on the downloaded 3D object files and the replication process.

In some embodiments, the processor is further configured to install 3D replication software and link the software to one or more 3D replication machines providing the requested 3D replication components to create an authorized 3D replication system for replication of the one or more 3D object files.

In an aspect, embodiments described herein provide an authorized 3D replication system comprising 3D replication software linked to one or more 3D replication machines. The system is configured to: initiate 3D object file access using a valid 3D replication key that corresponds with one or more 3D objects; establish and maintain a communication path to a licensor system; generate a set of 3D object files corresponding to the validated 3D replication key; permit access to one or more 3D object files of the set of object files after verifying capabilities of requesting 3D replication components of one or more 3D replication machines; and transmit real-time feedback commands to the licensor system related to activity on the one or more 3D object files and replication process by the requesting replication components.

In an aspect, embodiments described herein provide a method for a licensee to securely access 3D object files corresponding to one or more 3D objects for the purposes of replication using an authorized 3D replication system. The method involves: providing a 3D replication key that corresponds with one or more 3D objects to initiate 3D object file access; verifying the 3D replication key over an established communication path to a licensor system; generating a set of 3D object files associated to the one or more 3D objects corresponding to the verified 3D replication key; providing authorization to proceed with 3D object file download after verifying capabilities of the licensee's 3D replication components of the authorized 3D replication system; and providing real-time feedback from the authorized 3D replication system to the licensor system related to any activity on downloaded 3D object files and replication process.

In some embodiments, the method further involves installing authorization software and associating it with one or more 3D replication machines to create the authorized 3D replication system.

In some embodiments, the 3D replication machine can be any machine that uses an additive material method to produce a physical object with a height, width and depth.

In some embodiments, the 3D replication machine can be any machine that uses a material removal process to produce a physical object with a height, width and depth.

In some embodiments, the 3D replication machine can be a 3D printing machine, a CNC machine, a laser cutting machine or a combination of one or more of any of these machines.

In some embodiments, the association between the authorization software and the 3D replication machine is a digital communication path over a network.

In some embodiments, the association between the authorization software and the 3D replication machine is via a radio frequency.

In some embodiments, the association between the authorization software and the 3D replication machine is via near field communication.

In some embodiments, the association between the authorization software and the 3D replication machine is done via electrical circuitry within the 3D replication machine.

In some embodiments, the 3D replication key is an alphanumeric value displayed on a web page after securing a license to make one or more 3D objects.

In some embodiments, the 3D replication key is physically printed and exchanged during negotiations to obtain licensing rights to replicate one or more objects.

In some embodiments, the 3D replication key is selected from an electronic catalogue of listed 3D objects that accompanies the purchase of a specific make and model 3D replication machine.

In some embodiments, the 3D replication key can be used as an out-of-band encryption key to create a symmetrical session key for a communication exchange.

In some embodiments, the 3D replication key is an unreadable digital value.

In some embodiments, the 3D replication key is a constantly changing number presented visually by a security token, USB key or similar security device.

In some embodiments, the 3D replication key has an assigned validity time span.

In some embodiments, the 3D replication key is tied to the bio-identify of a specific user.

In some embodiments, the providing of a 3D replication key is performed through a digital communication.

In some embodiments, the providing of a 3D replication key is performed through typing an alphanumeric value into a user interface.

In some embodiments, the providing of a 3D replication key is performed through a radio frequency communication method.

In some embodiments, the providing of a 3D replication key is performed through the user of near field communication.

In some embodiments, the communication path is implemented via a SSL connection over physical communication paths.

In some embodiments, the communication path is implemented via a SSL connection over radio frequency communication paths.

In some embodiments, the communication path is implemented by a proprietary communication method which can exchange digital bits of information that can be encoded and decoded into communication messages.

In some embodiments, the method involves receiving a final authorization that the 3D replication key was valid.

In some embodiments, the method involves receiving a final authorization that associated one or more 3D object files were located.

In some embodiments, the method involves receiving a final authorization that there are remaining copies of the one or more 3D object files available for replication.

In some embodiments, the method involves receiving a final authorization with a detailed listing of the necessary capabilities for each of the one or more 3D object files to be replicated.

In some embodiments, the method involves verifying of capabilities of the 3D replication system and presence of an online 3D replication machine. In some embodiments, the verifying of capabilities of the 3D replication system includes verifying that the 3D replication machine is not currently executing a replication. In some embodiments, the verifying of capabilities of the 3D replication system includes the type of material that must be used for the replication process.

In some embodiments, the verifying of capabilities of the 3D replication system includes the manufacturer of the material that must be used for the replication process. In some embodiments, the verifying of capabilities of the 3D replication system includes the amount of material required for the replication process to begin. In some embodiments, the verifying of capabilities of the 3D replication system includes matching temperature settings to ensure the temperature is within a specific range. In some embodiments, the verifying of capabilities of the 3D replication system includes confirming any combination of make, model and manufacturer of the 3D replication machine.

In some embodiments, the method involves securely accessing the one or more 3D object files by reading the full encrypted 3D render files from a memory storage device.

In some embodiments, the method involves securely accessing the one or more 3D object files over a radio frequency method of communication.

In some embodiments, the method involves securely accessing the one or more 3D object files over near field communication.

In some embodiments, the method involves securely accessing the one or more 3D object files by reading internal memory within the 3D replication machine.

In some embodiments, the method involves securely accessing the one or more 3D object files via a download over a secure SSL Internet connection.

In some embodiments, the method involves securely accessing the one or more 3D object files by reading an attached storage medium.

In some embodiments, the method involves accessing the one or more 3D object files via the download of an encryption key to decrypt the one or more encrypted 3D object files to obtain the original one or more 3D object files.

In some embodiments, the method involves accessing the one or more 3D object files by downloading configured portions of the 3D object file to the authorized 3D replication system.

In some embodiments, additional portions of the 3D object files are only given to the authorized 3D replication system when confirmation is received of successful reception and execution of earlier 3D object files portions from the 3D replication system.

In some embodiments, the configured download method for the 3D object files involves check-summing each portion that is given to the authorized 3D replication system.

In some embodiments, the downloaded portions of the 3D object file are encrypted.

In some embodiments, the encryption key for the encrypted portions of the 3D object file is negotiated just before the first portion of the 3D object file is provided to the authorized 3D replication system.

In some embodiments, the providing of real-time feedback includes a detailed message including a range of statistical analysis about replication history from the authorized 3D replication system.

In some embodiments, the providing of real-time feedback includes progress reports on the replication process.

In some embodiments, the providing of real-time feedback includes confirmatory information at the completion of the replication process.

In some embodiments, the providing of real-time feedback includes ongoing temperature readings of the 3D replication machine.

In some embodiments, the providing of real-time feedback includes ongoing temperature readings and other prescribed variable of the environment housing the 3D replication machine.

In some embodiments, the providing of real-time feedback includes any replication failure information.

In some embodiments, the communication real-time feedback includes audit data and Analytics Data to authorized third parties which may include regulatory organizations. In some embodiments, the Analytics Data is a correlation of the information regarding an original 3D object with the real-time feedback.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF DRAWINGS

FIG. 5 is an illustration of an exemplary 3D replication software screen that depicts some of the elements described within this patent application.

DETAILED DESCRIPTION OF DRAWINGS

In an aspect, embodiments described herein provide a system and method for replicating or modifying a 3D object on an authorized 3D replication system. Some embodiments may relate to access of a 3D object in order to modify or customize the object prior to replication. Other embodiments may relate to the access of a 3D object in order to create a physical 3D replica of the object. Further embodiments may relate to access of a 3D object in order to perform 3D slicing or selective submission of the 3D object for replication. The system and method can address concerns around security and quality assurance. The system and method can benefit the rights holder by providing advanced protection for their intellectual property. The system and method can benefit the rights holder by providing an audit record relating to 3D objects, for example. The system and method can protect the licensee who acquires the rights to reproduce a given 3D object and expects it to have a given quality and reliability. The system and method can check that elements that were promised as part of the sale are fulfilled from the purchaser's point of view. With verification of quality built into the system, the practice of providing a warranty on a replicated 3D object can become feasible. Using feedback during the replication process the system can also determine the date to start the warranty on replicated items. Embodiments described herein can include checks on all software and hardware elements that access the licensed 3D object files. For example, capabilities on software could include which 3D computer aided design (CAD) software packages are allowed to modify certain 3D design files that make up a 3D object file. The capabilities on the hardware could include all aspects of the 3D replication machine, for example, it can ensure that replication materials match the original 3D object requirements, the manufacturer, make and model for the 3D replication machine matches requirements and that temperature and other environmental variables are within prescribed limits. These and other capabilities can ensure that the highest level of quality management is provided. The system can provide a two-factor authentication to reduce theft, hacking and illegal copying of 3D renders. The system can provide feedback at all stages to track success or failure and to allow for audit, statistical and analytic information to be collected and to be reported back to the licensor and authorized third parties which may include regulators. Analytic information can be further enhanced by correlating the original 3D object information provided by the licensor with the completion data provided by the authorized 3D replication system.

Figure 1:
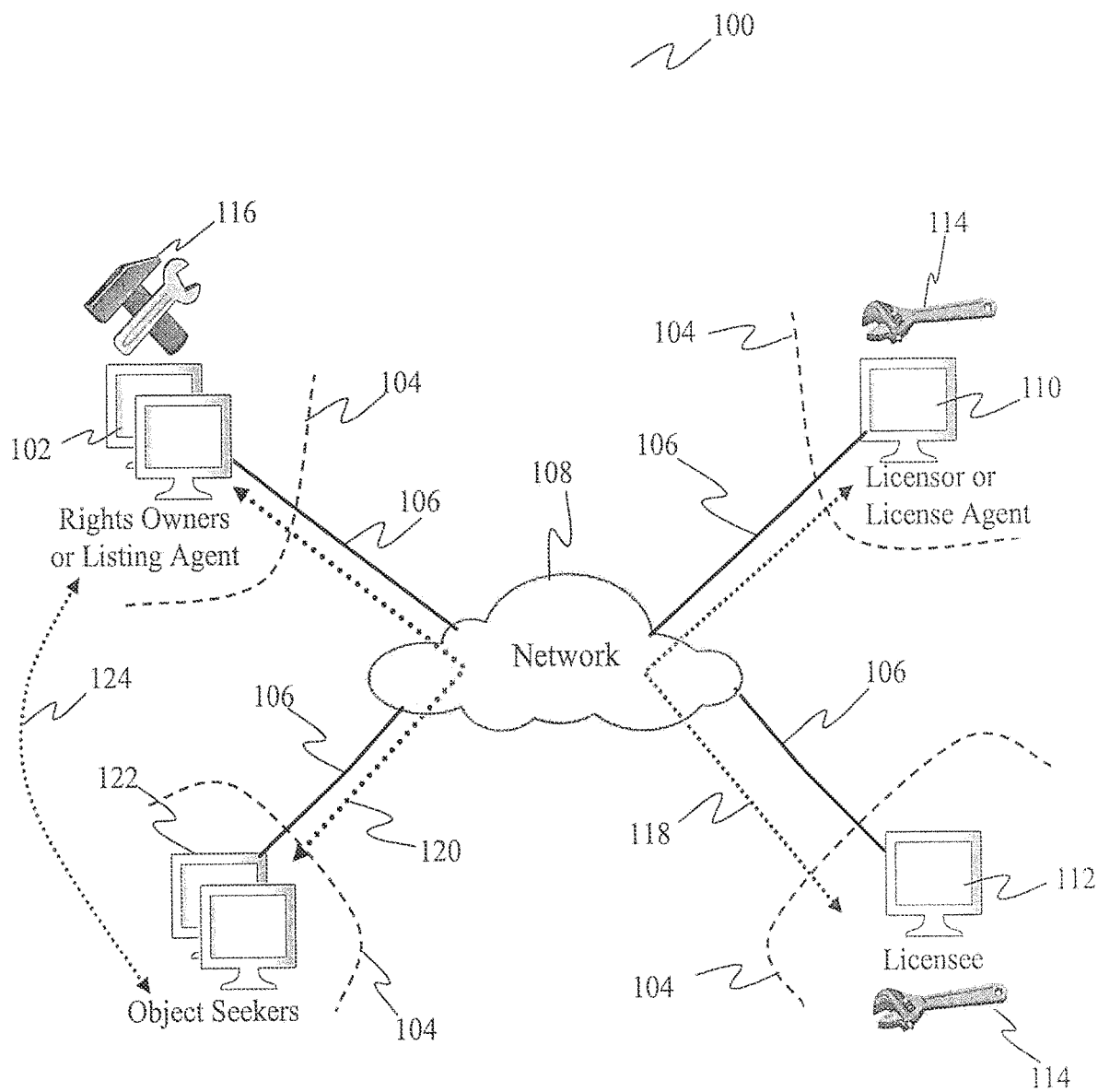
FIG. 1 is an illustration of an exemplary network overview showing several relationships between a licensor or license agent and a licensee.

Turning to FIG. 1 there is an illustration of an example network overview 100 showing several relationships between a licensor or license agent 110 and a licensee 112. In this example there are one or more rights owners or a listing agent 102 with available 3D objects 116 for replication. Before rights have been granted, the term rights owner 102 or listing agent 102 is used in this illustrative example to emphasise that these 3D objects 116 are being marketed and advertised for licensing. This might be on a public network like the Internet 108. As object seekers 122 are looking for 3D objects (e.g. using a device having a memory and processor) to replicate they can find 3D objects 116 from either rights owners or a listing agent 102, for example. These 3D objects 116 are digitally made available as 3D object files 116. These 3D object files can include but are not limited to the original 3D design files, 3D rendered files and G-Code files to name just a few types of files. The term 3D object can refer to any physical object that has a length, height and depth and can be represented by one or more digital objects that can be referred to as a 3D object files. Accordingly, a 3D object file can be a digital representation of characteristics of a 3D object (or a portion thereof) that enable replication of the 3D object (or a portion thereof) by a replication system. A 3D object file can include instructions or commands for a 3D replication system to generate one or more physical 3D objects. A 3D object may be made of multiple physical parts and each part may be represented by a corresponding 3D object file. A 3D object file can be linked to a set of requirements or capabilities needed by a 3D replication system in order to generate the corresponding 3D object. In some embodiments, CAD software can access and load a 3D object file to make customizations to the 3D object files. The customizations may update the requirements. The CAD software can initiate the replication process and send commands to the 3D replication system.

Rights owners 102 can be manufacturers, individual 3D object creators, a license agent or a company that has purchased and fully owns the rights to sell and distribute 3D object files 116. Any of these rights owners 102 could also use a listing agent to market and advertise their 3D object files 116 for licensing. Also within the network illustration 100 are object seekers 122. Object seekers 122 can be a wide range of consumers or businesses looking for 3D object files 116 in order to create a product. In another exemplary embodiment the rights owner 102 might be one division or department in a company and the object seeker 122 is a separate division that needs access to one or more 3D object files 116. The relationship between rights owners 102 and object seekers 122 can vary depending on many factors. An object seeker 122 could be a middle-tier support company looking to provide warranty and product support. The object seeker 122 could be a public 3D printing-on-demand company that has 3D printers for hire. The object seeker 122 could be a consumer that is browsing the Internet looking for something to reproduce. The object seeker 122 could be internal to a large company, for example like an airline company, and they are located physically in a different location. Perhaps they wish to 3D print a part to a malfunctioning jet engine for one of the airline's fleet and need a specific 3D object file 116 to correct the malfunction. The object seeker 122 could also be within a kiosk in a retail store or in a stand-alone location. They might purchase the 3D object files 116 they desire and 3D print them at the same time. These and many other possible relationships are possible between the rights owner 102 and the object seeker 122.

The object seeker 122 may secure rights using digital means 120 through network 108 or through other means 124. In FIG. 1 rights owners 102 and object seekers 122 are shown as computers for convenience. They could be people running computers, or just people meeting face-to-face, over the phone or in some other way to exchange and complete licensing negotiations. If the object seekers 122 are using a digital means 120 to acquire rights this could be over a public wide area network like the Internet 108. In another exemplary embodiment they could be internal to the same company and using a virtual private network (VPN), Intranet network or some form of Internet of Things (IoT) network. In another exemplary embodiment a wireless network 108 is being used, for example GSM, CDMA, 3G, 4G, LTE, 802.11 (known as WiFi) or other similar radio frequency network 108. As mentioned the object seeker 122 may acquire replication rights via negotiations or face-to-face conversations 124 and computer systems are not initially involved. In other embodiments the licensor 112 secures replication rights via the reception of a book or user manual that lists 3D replication keys beside their associated 3D objects names and descriptions. Once rights are acquired the object seeker 122 becomes a licensee 112 and the rights owner 102 becomes the licensor or license agent 110.

Each of the endpoint rights owners or listing agents 102, licensor or license agent 110, licensee 112 and object seekers 122 can share a common connection point through link 106 to a shared network 108. These links 106 could be physical or radio frequency links depending on the network 108. Physical links include hard wired Ethernet links, cable modems, fibre links, T1 connections and other similar links. Examples include protocols like GSM/GPRS, Bluetooth links, various 802.11 protocols, satellite links, UTMS and CDMA-200 links or other similar radio frequency protocols. Even if initial replication rights are secured through some non-digital means, for example a face-to-face negotiation, a digital link is required for the eventual access and replication of a 3D object. Also shown around each endpoint 102, 110, 112, 122 is a boundary point 104 that can present a collection of computers behind a firewall, a division or department within a large company or just a point where a network router is used to connect to a network 108.

In some embodiments, the object seekers 122 are part of an authorized 3D replication system with a data storage device storing 3D replication software connected in real-time to a licensor device having 3D objects. The object seeker 122 has a processor configured to establish and maintain a communication path to the licensor system 110 or rights owner 102, for example, The processor validates a 3D replication key that corresponds to 3D objects using the communication path. The processor list a set of the 3D object files for the 3D objects corresponding to the validated 3D replication key. The processor can verify capabilities of requesting 3D replication components for replication of a selected one or more 3D object files of the set of the 3D object files according to a replication process. In some embodiments, the processor is further configured to verify the capabilities by determining that the requesting 3D replication components have a type and an amount of material for the replication process. The processor can permit access by the object seeker 122 or requesting 3D replication components to the selected one or more 3D object files of the set of the 3D object files. The processor can transmit real-time feedback commands to the licensor system 110 or rights owner 102 related to activity on the selected one or more 3D object files and the replication process by the requesting 3D replication components.

In some embodiments, the processor is further configured to validate a licensee's computing environment for compatibility through the established communication path prior to listing the set of 3D object files. In some embodiments, the processor is further configured to verify a set of primary capabilities received by the licensor device. In some embodiments, the processor is further configured to list the set of 3D object files upon verifying a set of capabilities for the 3D objects. In some embodiments, the processor is further configured create one or more customizations to the selected one or more 3D object files and initiate the replication process of the one or more customizations to the selected one or more 3D object files to create a customized 3D object. In some embodiments, the processor is further configured to link the one or more 3D replication machines providing the requested 3D replication components to create an authorized 3D replication system for replication of the one or more 3D object files.

In some embodiments, the 3D replication key is an unreadable digital value. In some embodiments, the 3D replication key provides an out-of-band encryption key to create a symmetrical session key for a communication exchange.

In some embodiments, the processor is further configured to receive a final authorization that there are remaining copies of the one or more 3D object files available for replication. In some embodiments, the processor is further configured to access the one or more 3D object files via the download of an encryption key to decrypt the one or more encrypted 3D object files to obtain the original one or more 3D object files.

As described in detail in FIGS. 2 and 3 once the object seeker 122 acquires rights they are given a 3D replication key to confirm later their rights exist. The 3D object files 114 that have been licensed could involve a single part, a collection of parts or many parts that make up a fully operational product 114. They might get a variety of 3D object files that can be modified, manipulated as in the case of a 3D slicer software program or directly submitted to a 3D replication machine. For Internet transactions it could also represent the successful financial transaction and then be related to one or more 3D object files. The 3D replication key could be exchanged after a specific negotiation process between two parties involving a written agreement. It could be placed on some form of portable media, it could be transferred to a mobile device and it could be associated to a security token or USB security key to name a few methods. The 3D replication key is provided out-of-band to the 3D object files when it is download over a data communication path, for example over the Internet. When dealing with Internet exchanges, it is necessary to provide these two items via separate communication methods helps to ensure two-factor authentication is possible. In some embodiments, the 3D replication key can also be used to negotiate a specific symmetrical key to encode the delivery for one or more portions of the 3D object files. In one embodiment the 3D replication key is associated to files, for example 3D object files via a database entry and the 3D replication key is related to the database access keys. In another embodiment the 3D replication key is associated to a specific financial transaction that is then associated to 3D object files within a database entry.

The 3D replication key can take many forms depending on the rights owner 102 and how they have setup their computer system 110. For example, it could be an alphanumeric string that can be copied down and used later. In another exemplary embodiment rights to one or more 3D objects could be granted by purchasing a given product, like a 3D replication machine and the 3D replication key could be printed in a manual or user's guide. The 3D replication key can have many representations including alphanumeric, digital code, token-based, unprintable string, a USB security key, a mobile device with a unique signature, security token and many similar type devices. The method of providing the key can vary depending on how the rights were acquired and the 3D object being replicated. If an Internet transaction was performed the 3D replication key could be displayed on a computer screen, emailed or even sent via text messaging (Short Message Service—SMS) to the licensee 112. If the user was in proximity to the 3D replication key it could be provided via Bluetooth or Near Field Communication (NFC) to a mobile device like a cell phone or mobile tablet device. If the 3D replication key is a security token, often called security FOB then it could have been physically handed to the licensee during a successful negotiation to secure replication rights.

With replication rights acquired, the licensee 112 can then proceed to establish a communication path 118 to the licensor (device) 110 and begin any necessary manipulation and replication to create the desired 3D object from the 3D object files 114. Example steps and methods for download and exchange of the 3D object files 114 are detailed in FIGS. 2, 3 and 4.

Figure 2:
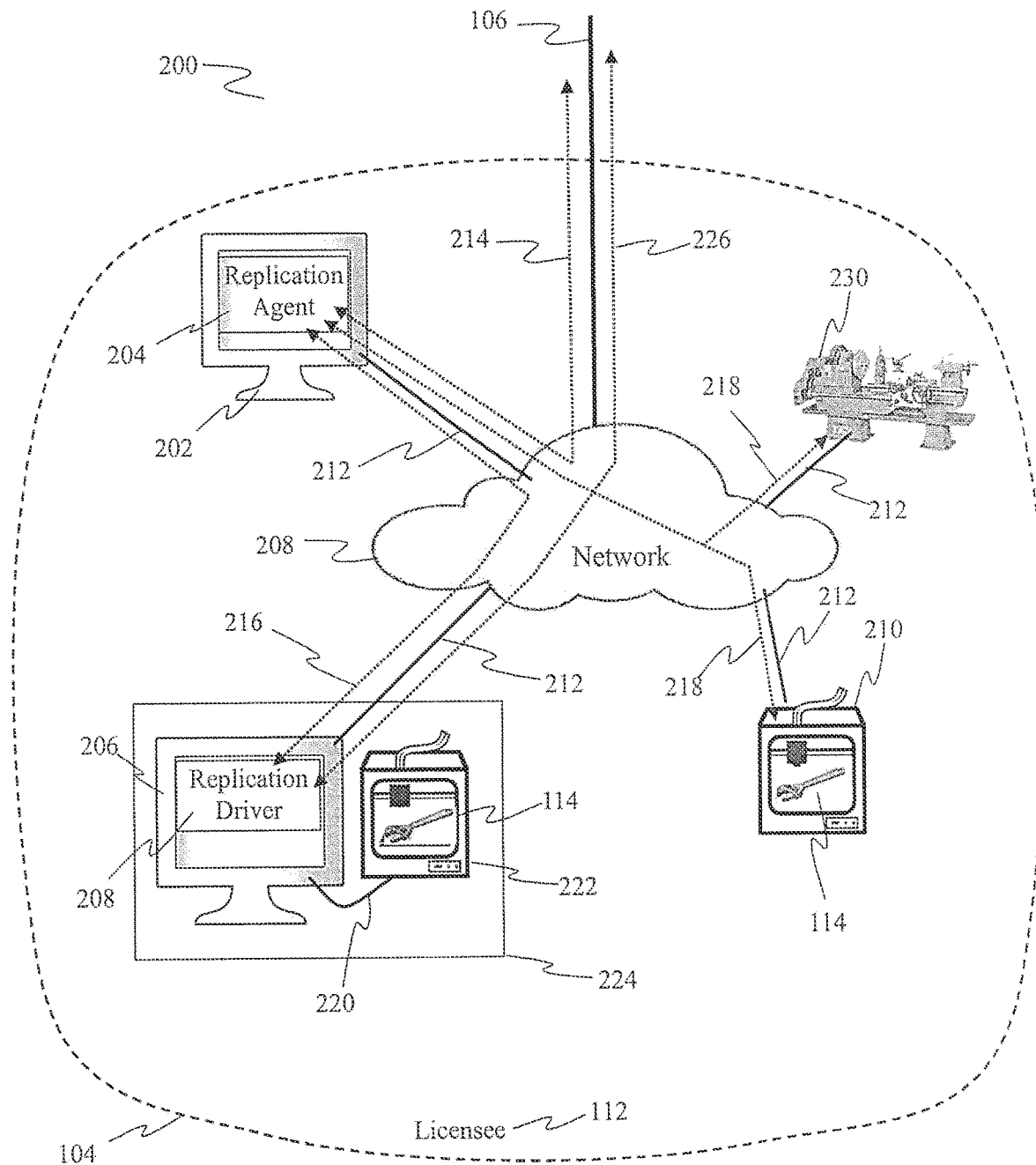
FIG. 2 is an illustration of an exemplary detailed view of the elements within a licensee's environment.

Turning to FIG. 2 there is an illustration of an example detailed view 200 of the elements within a licensee's 112 environment. Also illustrated is the presence of an optional firewall or division of some kind 104 from other computers or networks accessible over link 106. Firewalls can improve security and further help protect the licensor's 110 rights and reduce theft for the licensee 112. The link 106 beyond the firewall or division point 104 may be wired or wireless and will be used to reach the licensor 110 to gain access to the necessary 3D object files.

Within the licensee's environment 112 is a collection of computers 202, 206 and 3D replication machines 210, 222, 230. These systems 202, 206, 210, 222 and 230 are all connected 212 to a network 208, which could be a local area network (LAN), an Intranet, a virtual private network (VPN), or other similar network technology. These connections 212 can include Ethernet links, Gigabit Ethernet links, WiFi links and other connection methods. A method can connect a private network 208 to an outside network 108 via a shared communication path 106. This type of communication link 106 could also connect to other Intranets in branch offices for a larger organization. Such paths also allow private communication to be protected behind shared firewalls 104, separate firewalls with special permissions, virtual private networks (VPN) using IP tunnelling with advanced security methods or other similar connection methods.

In one exemplary embodiment a user at computer 202 decides to look for 3D object files 114 via a communication 214. This type of embodiment might be used for the Internet and where a listing agent 102 might be employed. During the course of that communication 214 they might perform a monetary transaction to acquire the rights to use one or more 3D object files 114. Such transactions and communications can be performed over a secure sockets layer (SSL), for example. With rights acquired computer 202 acquires the rights to replicate a given 3D object they are given a 3D replication key that is needed to complete the necessary authentication to acquire the 3D object files 114 related to that 3D object. This 3D replication key could be provided visually for them to copy down on paper, in other embodiments it could also be electronically mailed or sent through short messaging service (SMS) to them so they can cut and paste it later. In another exemplary embodiment the user at computer 202 already has the 3D replication key from a face-to-face licensing negotiation, from the user's manual of a 3D replication machine 210, 222, 230, it was received on a portable memory device, it could be a security token rotating value or it could be represented in some other advanced fashion. For example, for an Internet-based transaction the 3D replication key might be a simple alphanumeric value displayed to the user. This value could then be physically typing into a user interface (UI).

With replication rights acquired, computer 202 may need additional software to create an authorized 3D replication system to facilitate the reception of the 3D object files 114. It is possible the software has been previous downloaded or was received from the licensor 110 or comes as part of a 3D replication machine. The necessary software could be in one part or several parts. In one embodiment a first piece of software is used to interface to the user and interacts with the licensor's system 110. Then a second piece of software is used to interface to the 3D replication components, like CAD software, 3D slicers and physical 3D printers. In some embodiments one part of the necessary software is embedded into a 3D software product like a CAD program or a 3D slicer program. Accessing the necessary software or acquiring and installing of software to create an authorized 3D replication system can be accomplished in many ways. For example, the software could be downloaded over a network 208. The software required could also be built into Internet browser extensions and browser add-on software. The software could also be run within a browser via a distributed cloud computing model. It could come pre-installed on handheld cellphone or smartphones or be downloaded like a cell phone application (cell phone app) via a public Application Store. In this illustration the software is shown in multiple pieces as a replication agent 204 and a replication driver 208. It is also possible that the purchased 3D replication machine has the necessary software built into the machine (for example replication security firmware as shown in FIG. 3). In this case the step of acquiring the software takes place by purchasing the correct 3D replication machine with the necessary software already installed. Depending on the type of 3D replication machine different software installation options can be used. Establishing an authorized 3D replication system could involve steps described in subsequent diagrams. For example certain types of CAD software might be required, perhaps specific 3D replication machines must be installed, certain types of material may have to be loaded into the 3D replication machines or perhaps it is necessary that specific operating systems (0/S) and O/S upgrades must be present. Once these and other verifications are passed the system can become an authorized 3D replication system and proceed to the secondary authentication stage. These are a few example of how to access software that will facilitate reaching the secondary authentication stage and being granted final access rights to the 3D object files 114.

If permitted by the licensor 110 the licensee 112 may also be given complete encrypted 3D object files 114. This could be either downloaded over the secure SSL link 214 or provided on some portable media, micro-SD card, USB thumb drive, a mobile device, a tablet, a laptop computer, embedded in firmware within a 3D replication machine or through some other similar means. Such arrangement could be established when large quantities of 3D objects have been licensed and speed and reducing data transmission costs are a factor. In these cases, the licensee 112 will only need to get a decryption key and any necessary software to unlock the encrypted 3D object files 114 to access and replicate the 3D object they desire. 3D replication machines can include a system that uses either the addition of material, or the removal of material to create a 3D object. For example, removing material for creating 3D objects can be implemented using Computer Numerical Control (CNC) machines, lathe machines and laser cutting machines.

Creating a communication path from the software to the licensor can be done using various data communication protocols and methods. These can take place over wired or wireless connections using a secure sockets layer (SSL), virtual private network (VPN) or other similar network technologies. Depending on the type of software installed this can vary and will be discussed in detail later in this application.

In the embodiment where a replication agent 204 and replication driver 208 are used they share similar functionality and can coordinate their operations with each other through a communication link 216. In other embodiments the replication agent logic 204 could be running within a browser with advanced plug-ins and extensions. In another embodiment the replication agent logic 204 is embedded within a 3D software program, such as CAD software or 3D slicer software, for example. The software could also be interfaced over Internet HTML methods to an Internet cloud computing model. In some embodiments, advanced CAD software, 3D editing software or even 3D replication machines could be equipped with 3D slicer functionality among other functions they can perform. The replication agent 204 logic allows the verification of 3D object rights by providing an input method to submit the 3D replication key to the licensor 110 for authorization. It also interacts with the logic of the replication driver 208 to verify that an authorized 3D replication system 224 has been established.

In FIG. 2 the replication driver 208 represents a printer driver that also embeds the functionality of embodiments described herein. There are many embodiments for the logic of the replication driver 208. The replication driver 208 logic interacts with logical and physical elements of the existing system to verify that the capabilities exist to become an authorized 3D replication system 224. These capabilities could include areas like 3D replication machine type, replication material loaded into the machine, the amount of material loaded into the machine, the temperature of the machine internally or externally, a connection to an external camera to monitor the output number and quality of the 3D replicated object. These and many other tests could be performed to verify the expected and required capabilities exist to gain full access rights to the 3D object files. In other embodiments the logic of the replication driver 208 could be shown as a replication monitor, which verifies files passing to the 3D replication machine. In other embodiments the logic could be embedded into 3D software products like CAD software or 3D slicer software. In those embodiments where the replication driver 208 is a print driver, such print drivers are usually created by the manufacturer of the 3D printer 222 for various operating systems (O/S) like Microsoft Windows, Apple IOS, UNIX and other such O/Ss. When a manufacturer integrates the logic of the invention into their print driver to create a replication driver 208 this represents a very close coupling to the 3D replication machine 222. Depending on the O/S, a print driver could have other names, like Print Server, Line Print Daemon or Internet Printing Protocol. The replication driver 208 may also work co-operatively with other O/S components as necessary like the Local Print Provider and Print Monitor depending on which O/S it is working in. In the embodiment where the manufacturer has not integrated the inventive steps of the invention into their print driver the replication agent 204 will work with other print drivers and 3D slicers where necessary to facilitate secure printing of the 3D object files 114. FIG. 2 also shows the path that does not include a replication driver 208 as illustrated through communication path 218 to 3D replication machines 210, 230. Without the closely coupled relationship of the replication driver 208 to 3D replication machine 222 the flexibility of the replication agent 204 can be associated to one or more 3D replication machines 210, 230. This allows the replication agent 204 to select the optimal machine to use by matching the capability requirements against the machines capabilities to find the correct match. This is discussed in greater detail to follow.

In order to proceed to the next stage, the computer 202 provides a 3D replication key to the replication agent 204 or to the other software types described earlier that contain the replication agent 204 logic. The 3D replication key could be provided through a configuration file, through a UI, through NFC, through Bluetooth communication or through some similar means. The 3D replication key could be exchanged using a message passed within a local area network (LAN) like an Intranet. It could involve entering a code from a security token, or physically touching or inserting a USB security key into the 3D replication machine. If necessary, the replication agent 204 may also require the licensor's 110 routing address. This address could be an intranet location, a domain name, an IP address, a universal resource locator (URL) or some similar addressing method. This could also come through a configuration step, through a UI, be embedded in the 3D replication key or by some other similar means.

With this information the replication agent 204 first confirms that it is able to open a communication path 214 through the provided address to the licensor 110. With this communication path 214 opened, the replication agent 204 can request authentication the 3D replication key from the licensor 110. In one embodiment the 3D replication key is used to lookup the database entry matching the 3D replication key in order to find the 3D object licenced. In another embodiment the 3D replication key is used to lookup the database entry in a transaction database that provides another key to lookup the database entry machine the 3D object desired. Once the licenced 3D object is located it can be confirmed that there are replications remaining for the one or more 3D object files 114 and perform any other verification necessary. It is also possible that the licensor 110 has included one or more primary capabilities that must be verified before a list of 3D object files 114 will be provided. The replication agent logic 204 can interact 216 with the logic of the replication driver logic 208 for assistance in verifying some capabilities. For example the replication driver logic 208 might have to verify the type and version of the 3D replication machine 222, or that an external camera has been set up and available to watch all output from 3D replication machine 222. In some embodiments, the system might verify that a certain 3D replication machine is present before allowing any 3D object files 114 to be even viewed on a computer screen. In other embodiments the replication agent logic 204 might only have to verify that a certain O/S is present or a certain release and version of O/S and therefore might not have to communicate 216 with the replication driver logic 208. For example a very popular O/S like Windows XP, that is no longer supported by Microsoft© might not be allowed to be present in the system. With this communication path 214 available and the 3D replication key verified the replication agent 204 proceeds to verify any primary capabilities and once that is completed to provide a detailed list of all 3D object files 114 associated to the licensed 3D object.

When there are primary capacities present the replication agent 204 or similar software agent will verify any primary capabilities that have been requested. If there is a specific 3D replication machine required, for example manufacturer or version or revision it will proceed to request these be located by the user. Once the replication agent 204 or similar software is installed and operating it is capable of establishing a connection to one or more 3D replication machines 210, 222, 230. The 3D replication machine 210 could be accessible 212 in different possible ways. For example it could be directly connected, it could be accessible over a network 208, like a Local Area Network (LAN), via WiFi, via Bluetooth, or even an Ethernet connection. Also 3D replication machine 230 might be a different type of machine with different functionality, like a laser cutter or an advanced lathe machine 230. Through the replication agent 204 on computer 202 it is able to associate the replication agent 204 via communication 218 to one or more 3D replication machines 210, 222, 230. In some embodiments when the replication agent logic 204 is communicating directly to a 3D replication machine 210, 230 the replication driver logic 208 can also be present. Such a combined replication logic might be present in an advanced CAD software product with embedded logic to implement embodiments described herein.

In other embodiments the replication agent 204 might connect to many 3D replication machines 210, 222, 230 of the exact same type. This could be useful to help multiplex between machines of the same type as they could be busy doing other replications and only an unoccupied machine can be used to receive parts of the 3D object files 114. In other embodiments the licensor 110 has requested verification that more than one 3D replication machine 210, 222, 230 is present. This would be important if the one or more 3D object files 114 required different steps to be performed. The replication agent 204 or other software should be capable of multiplexing the one or more 3D object files 114 between the one or more 3D replication machines 210, 222, 230 based on capability specifications provided by the licensor 110. These differences in 3D object file 114 types are shown through the replication agent 204 or the replication driver 208 interface as illustrated in detail in FIG. 5.

For other primary capabilities the replication agent 204 would go through similar checks. For example it might connect to the computer's registry system to verify what O/S is being used, its version, serial number, revision and other types of information about the system. Once all these primary checks are successful an authorized 3D replication system 204 can be created. With the creation of an authorized 3D replication system 204 the computer 202 can proceed to provide a listing of all 3D object files 114 and eventual secondary authorization on any 3D object file 114 selected.

From the provided list of 3D object files 114 the computer 202 can update or modify the listed 3D object files 114 as needed. These file can range from 3D design files, 3D render files, 3D G-Code files and other types of files. 3D object files 114 can go through several stages or transformations before they are sent to a 3D replication machine 210, 222, 230 for replication. This also means that a licensee 112 might be able to acquire different types and classes of 3D object files 114 based on what the licensor 110 has agreed to release. Initially a designer (licensor 100 or licensor's 110 agent) creates and works with a visual representation of the 3D object they wish to replicate. This could be designed from scratch, initially input from a 3D scanner or generated using other methods. These types of 3D object files 114 can be referred to as 3D design files which are a sub-category of 3D object files 114. The software systems used to manipulate 3D design files are termed computer aided design (CAD) programs and are used to design 3D objects digitally. Also assisting the creation process can be 3D scanners that provide 3D spatial information to a CAD program. Once designed the creator of the design then uses the CAD program to generate a 3D render. 3D render files represent another sub-category of 3D object files. In the design stage a product like AutoCAD, Maya or AutoDesk can be used to create source design files. When it is time to reproduce the 3D object on a 3D replication machine the same CAD program can be used to output the 3D render in a variety of file formats depending on the 3D replication system capability. Example 3D render file formats include stereolithography (STL), Virtual Reality Modeling Language (VRML) and the CNC based formats like Drawing Exchange Format (DXF). Another example is Additive Manufacturing File Format (AMF) which is expected to become more widely used due to its ability to be compressed and also its ability to render colour. Other additional file formats may be used. CAD programs can be used to create 3D render files. Creating 3D objects digitally is complex particularly getting many of these 3D objects to interconnect and work together. The output 3D render files can be given to 3D slicer or 3D printing software to visual and output to a given 3D replication machine. These take 3D render files, for example with extensions like .STL, and turn them into G-Code language for a 3D replication machine. G-Code output allows many 2D layer-by-layer sections to be built upon each other to create a physical 3D object. G-Code can also represent another sub-category of 3D object files. This sub-category would be provided directly to a 3D replication machine.

There are many methods that could be used to access these 3D object files 114. For example the computer 202 can provide a file explorer type interface to enable selection of any given file to open it or submit it one of the associated 3D replication machines 210, 222, 230. In a browser interface a pick-list or drop-down menu could be used to highlight and select the 3D object files 114 of interest. For each type of 3D object file 114 selected a new set secondary capabilities could be attached that must be verified before full access to the file is granted. For example if a 3D design file 114 is selected then there can also be an secondary capabilities request to verify which CAD program is required to open the 3D design file and start working on it. The one or more selected 3D design files 114 could each have capabilities that must be verified to allow access. The verifying of secondary capability information is another step in the download decision.

For example if the 3D object file 114 selected is a 3D design file, and the licensor 110 has required a specific CAD program must be used to modify the 3D design file, the authorized 3D replication system 202 will verifies the presence of this CAD program. This could involve an additional communication with the licensor 110 or it could be already embedded in the information provided. For example the capabilities of a CAD program could include the manufacturer's name, the version and revision of software that is being used. For example, if the licensor 110 requires Auto-CAD version 7.9 or greater to be used to view, edit and modify its 3D design files then this will be verified. There could also be a check to verify that a specific 3D replication machine 210, 222, 230 is present to download this particular 3D design file. The licensor 110 might have decided that there is no point in allowing the download of 3D design files if the licensee 112 will never be able to actually replicate the 3D object.

In another example if computer 202 selects a 3D render file or a 3D G-Code file to access the replication agent 204 might perform additional checks on the associated 3D replication machines 210, 222, 230 to ensure they have the capabilities to correctly and accurately reproduce the 3D render file 114 requested. The verification process can get very detailed depending on the requirements of the licensor 110. Some examples of the types of secondary capabilities that could be checked include the type of material currently in the printing heads of the 3D replication machine 210, 222, 230. It might also include the required make, model and manufacturer of the 3D replication machine 210, 222, 230. It could include the amount of material available within the printing heads of the 3D replication machine 210, 222, 230. Additionally, the secondary capabilities could include the class of machine required by each of the one or more 3D object files 114 associated to the licensed 3D object. This class of machine will be used to direct the replication agent 204 as to which 3D replication machine 210, 222, 230 to use in order to fully and completely replicate the one or more selected 3D render files. It could also include the internal temperature of the machine and the temperature of the room it is in potentially along with other environmental variables. For example, it has been found that certain 3D printed materials are very sensitive to temperature and it is expected that future 3D printers will have external temperature sensors that can provide feedback to internal software monitors. Such information about temperature or other environmental variables could also be included in the secondary capabilities check and then can be monitored throughout the 3D replication process and fed back to the licensor 110. In other embodiments the secondary capabilities might also verify specialized 3D software is present, like a certain 3D slicer version, manufacturer and model is present on computer 202 before allowing download.

If all these secondary capabilities checks pass and all capabilities are approved then final access to the necessary 3D object files 114, as selected by the user is granted. Digital access to the one or more 3D object files 114 is then granted following the procedure established by the licensor 110. This procedure could include downloading an encryption key for unlocking the 3D object file the user already has, or downloading a full copy of one or more 3D object files 114 requested. Greater detail on download methods is provided later in this application.

Figure 8:
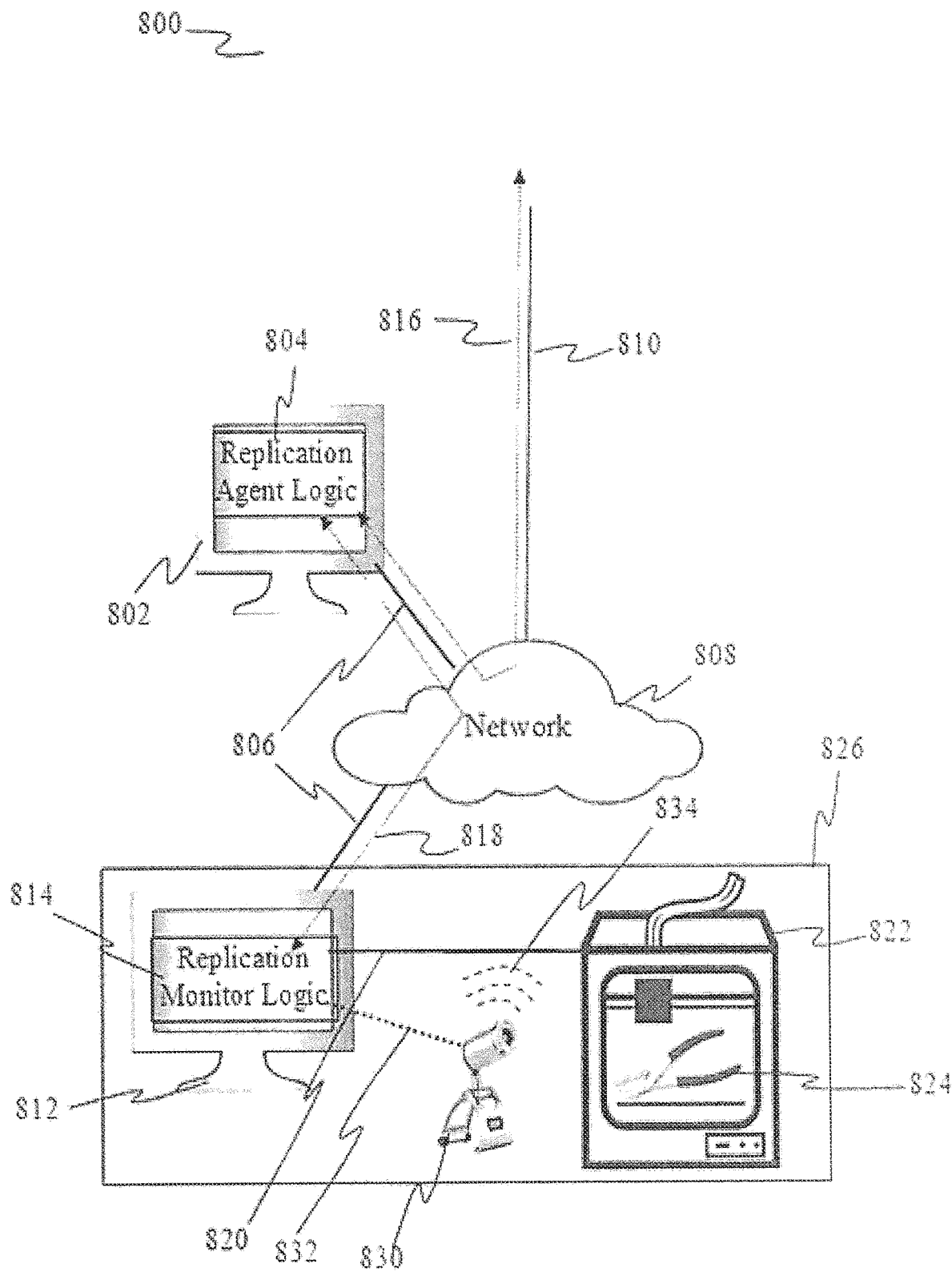
FIG. 8 is an illustration of an example detailed view of the elements within a licensee's environment including a replication monitor and external monitoring devices.

In another exemplary embodiment a computer 206 receives and downloads a replication driver 208. The replication driver logic 208 forms a control relationship with a 3D replication machine 222. As discussed the replication driver logic 208 can be implemented in different ways. In some embodiments the logic 208 is found within the replication agent 204, in other embodiments it acts like a closely related monitor as shown in FIG. 8. In yet other embodiments it might be embedded within a piece of 3D software like a CAD program or a 3D slicer program. The replication driver logic 208 is machine executable code that can be stored in memory to configure a processor to implement operations. The replication driver logic 208 has a more closely coupled interface to the 3D replication machine 222 and can monitor 3D printing parameters through a wider set of control signals. When the replication driver logic 208 is a print driver it can have a direct link as to what can be submitted to the 3D replication machine 222. When the replication driver logic 208 acts as a monitor it tracks activities in every way that is available to it. The replication driver 208 can communicate 216 all this information to the replication agent 204 for relaying back to the licensor 110.

When the replication driver 208 is a print driver it maintains a connection 220 to the 3D replication machine 222. This connection 220 could be a direct physical link, a Bluetooth connection, a WiFi connection an Ethernet link, or some other type of RF or physical connection. The replication driver logic 208 could be embedded within a browser, installed within the operating system of the computer 206 or be running as a stand alone application to name a few embodiments. As a print driver for 3D replication machine 222 the security is tighter but the flexibility is lower. That means the replication driver 208 can communicate to one 3D replication machine 222. In this embodiment, once the replication driver 208 establishes a communication path 220 to a 3D replication machine 222 an authorized 3D replication system 224 is established. In this embodiment the replication driver 208 works alone and provides the user with an interface and displays the associated 3D replication machine 222, a sample UI is shown in FIG. 5. Such an interface could be used by any user within the company or within a retail setting. For example computer 206 could be located in a stand alone kiosk within a department store to allow user to walk up and enter their 3D replication keys.

In another embodiment the authorization 3D replication software 204 is running within a browser and can communicate via WiFi or some advanced radio frequency (RF) technique to form a communication path. Further embodiments have the authorized 3D replication software 204 running on a mobile device, or mobile tablet computer. Some of these embodiments are further highlighted and discussed in FIG. 4.

As discussed earlier secure access of 3D object files 114 can be granted using several methods. With a valid 3D replication key and all capabilities checked for various components, like the correct CAD program, correct 3D slicer and 3D replication machines 210, 222, 230, file access is granted. In one exemplary embodiment the licensor 110 has previously allowed the download of the one or more encrypted 3D object files 114. This could have happened during the purchase process, through face-to-face negotiations or it came pre-loaded on a 3D replication machine or 3D replication kiosk in a department store. In these situations the software being used, like the replication agent 204 or replication driver 208 simply requires the download of the encryption key to decrypt the one or more 3D object files 114. In an exemplary embodiment the encryption key would not be stored in permanent memory and will be downloaded every time the one or more 3D object files 114 are to be access by either a CAD program or a 3D replication machine 210, 222, 230. In another embodiment where security is extremely heavy the encryption keys could be saved and re-used to save time and to avoid problems with connection outages. In one embodiment the requested 3D object file 114 is directly downloaded to the licensee 112. In another embodiment an encrypted copy of the 3D object file 114 is downloaded and decryption key follows. In another exemplary embodiment the software being used downloads the 3D object file 114 in smaller segments. Sending partial segments is ideally suited when the 3D object file 114 being downloaded is a 3D object file or 3D G-Code file being sent directly to a 3D replication machine 210, 222, 230. In this embodiment only partial segments are provided as 3D replication machine 210, 222, 230 successfully completes each segment. In this embodiment the download occurs in segments timed to match replication completion of previous segments, preferable in layers that would be generated by a 3D slicer. Perhaps after several layers of a 3D object file 114 are complete additional information will be sent. For example, after one third of the 3D object file 114 is complete the next one third segment is sent. In this way the entire 3D object file 114 is never held in one place at one time within the authorized 3D replication system 204 and 208. In another exemplary embodiment each segment can be protected with a hash, checksum or could even be encrypted to further reduce the ability to hack the information so as to minimize issues with the quality and integrity of the replica.

In an exemplary embodiment all communications occur over secure sessions 214, 226 which would be traditional SSL TCP/IP connections carried over the Internet 108 or over some proprietary security method used to further boost security and safety. In another exemplary environment the 3D replication key can be used to create a proprietary security key for various communications. In this embodiment various possible key exchange protocols can be used to create a shared security key, for example Diffie-Hellman or Simple Password Exponential Key Exchange (SPEKE) or Encrypted Diffie-Hellman (DH-EKE) could be used. When using a key exchange technique like SPEKE, the 3D replication key acts as an out-of-band secret that is used to seed the creation of a shared symmetrical key. This technique thwarts the man-in-the-middle attack used on Diffie-Hellman key negotiations. With differing levels of strengths and weaknesses any of these example protocols could be used to generate a shared symmetrical security key for additional security measures. These proprietary security measures can be used over top of an SSL-based TCP communication protocol or they could be used in place of an SSL-based TCP communication protocol. In these exemplary embodiments, where an encryption key is negotiated using a protocol like SPEKE, the delivery of fully encrypted 3D object files 114, or the delivery of portions of the 3D object file 114 will take place after the negotiated symmetrical key is complete.

Once the replication process begins the software being used, like the replication agent logic 204 or replication driver logic 208 can begin to track the progress of the software using the 3D object file 114 or 3D replication machine 210, 222, 230 attempting to replicate the 3D object file 114. This information can then be relayed back to the licensor 110 until the final stage of full replication is reached. This real-time feedback and audit information uses the active connection 214, 226 to the original licensor 110, license agent or a data collection agent. Real-time might be T1 speeds or near real-time depending on connection speeds, throughput rates, congestion issues and other factors. When a network like the Internet is used there can also be outages and failures that cannot always be predicted. The term real-time is meant to imply that a consistent connection has been opened with the intent of delivering data during any 3D object file 114 open requests, editing operations and 3D replication processes, using the best possible speed available. The connection is opened to the original licensor and owner of the 3D object files, or there might be a connection to a proxy agent that has been given rights to license the 3D object files on behalf of the owner. The connection could also be to a collection agent or tracking agent that collects and analyzes the data and provides a summary feedback message to the original licensor or license agent at the conclusion of any file access or replication process. This indirect collection agent might be needed if the volume of information becomes too great and analytics too computationally challenging for the original licensor or license agent. Both the frequency and type of feedback given to the original licensor or licensing agent will vary depending on configured parameters and the capabilities of the authorized 3D replication system. The amount of type of information available can vary between authorized 3D replication systems and the capabilities they possess.

Advanced system monitoring can be performed similar to how virus protection software operate. The software being used, like the replication agent 204 or replication driver 208 can install monitoring programs that watch all file access, the startup of any programs, termination of programs and print requests. These monitoring techniques can be used for virus detection methods. When dealing with software program access of the 3D object file 114, by CAD programs or 3D slicer programs or other similar software, behavior can be monitored and reported back to the licensor 110. This type of audit information will help detect inappropriate use of the 3D object file 114, attempts to copy or distribute when legal rights to not exist. Although these methods are not foolproof they provide advanced deterrents against criminals.

When monitoring 3D replication machines 210, 222, 230 advanced monitoring allows for failure detection, temperature and other environmental variations and completion results to be remembered and if a failure takes place then if necessary a 3D replication process can be restarted or reinitiated to ensure that the 3D printing process outputs a 3D object that is exactly as purchased by the licensee 112. If restarting or reinitializing the process continues to fail, then ongoing monitoring of all attached 3D replication machines 210, 222, 230 allows the system to stop the replication process and report the results. Since the information is kept within the licensor 110 additional legal replications can happen at any time as needed within the licensee 112. For example, perhaps one individual in the IT department acquires the rights for replication of a 3D object and offers copies to many people within the company. Then in the days and weeks that follow different individuals go to computer 206 and use the replication driver 208 to request their own copies until the maximum purchased has been reached. To do this they would only need to input the 3D replication key into the replication driver 208 to restart the process all over again. Other valuable information can also be returned back to the licensor 110. Audit information is also included with audit information and Analytics Data. The audit information might include the user's location, model number, serial number, time and date of the replication and any other relevant or prescribed information regarding any 3D object being replicated including information about the licensee and/or printer. For example, the information may be useful to determine the chain of custody, the final replication success and the time and place of replication, the replication parameters, which are all useful for things like warranty or to facilitate regulatory control or to provide data for consumer preference. Analytics data is created based on correlating the original information describing the 3D object provided by the licensor 110 to the actual completion information from a 3D replication system. In a retail environment information about age, gender, frequency and other purchases could be correlated to the 3D replication process to determine buying patterns and other useful analytics data.

Figure 3:
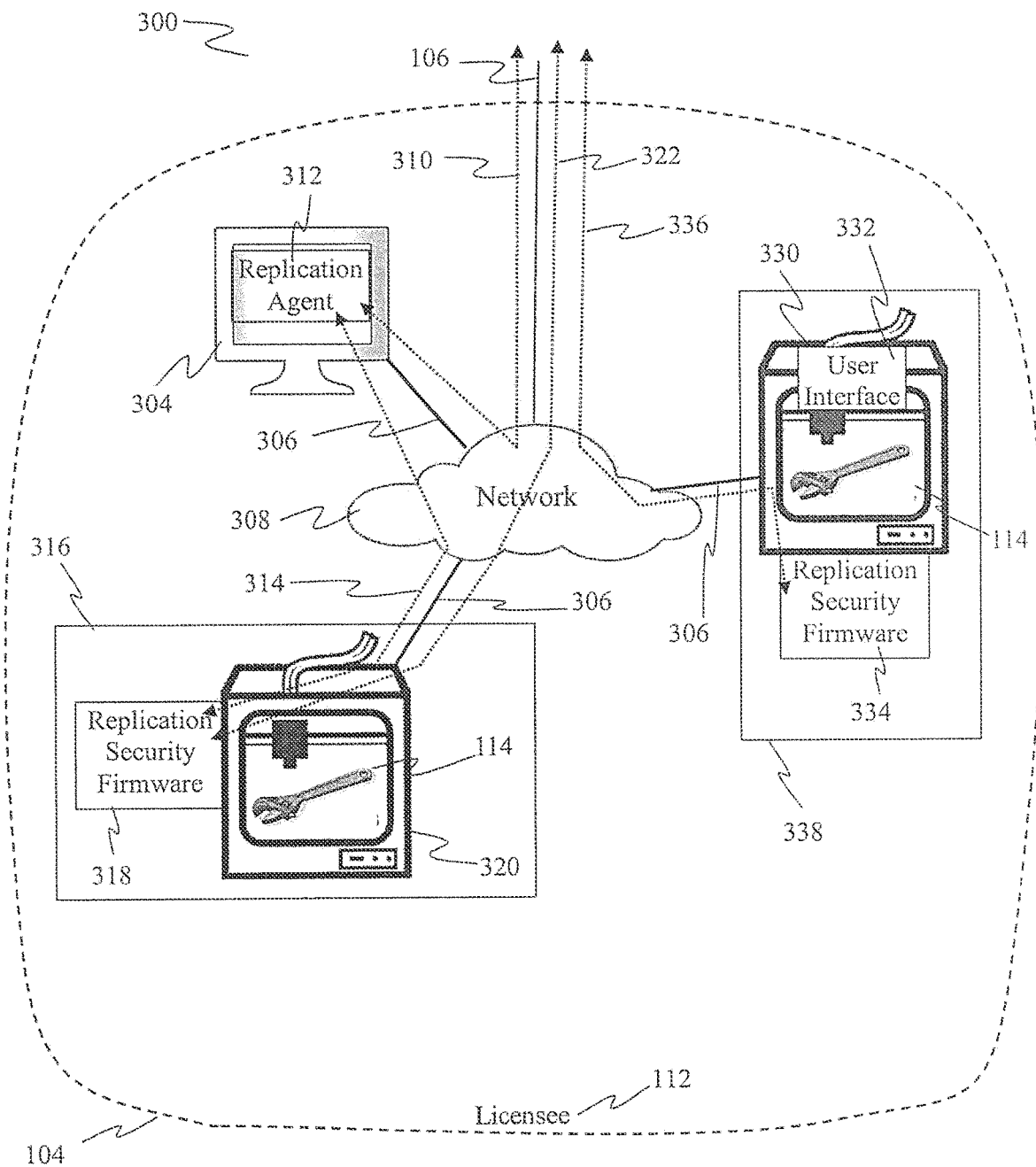
FIG. 3 is an illustration of an exemplary detailed view of the elements within a licensee's environment including additional replication security firmware.

Turning to FIG. 3 there is an illustration of an exemplary detailed view 300 of the elements within a licensee's 112 environment including additional replication security firmware 318, 334. In this exemplary embodiment the inventive steps disclosed in this patent have been integrated into the core of the 3D replication machine 320, 330 and are identified by the term replication security firmware 318, 334. This is possible when the 3D slicer functionality is included in the 3D replication machine 320, 330 or when 3D slicer operation has already been complete and .GCODE files are downloaded directly to the 3D replication machine 320, 330. 3D replication machines 320, 330 can have higher level functions with full UI access panels. Integrating the 3D slicer into the 3D replication machine 320, 330 is also starting to occur more frequently and graphical user interfaces are offered to help the user configure the 3D slicer for maximum performance. The motivation for a manufacturer to integrate the invention's logic into their 3D replication machine 320, 330 is self evident if it sold additional 3D replication machines 320, 330 for them. The ability to change and extend software inside 3D replication machines 320, 330 can be performed through software revisions and even remote downloads. Once this level of integration exists the replication security firmware 318, 334 establishes a communication path to the internal buffers and print execution module within the 3D replication machine 320, 330 to create an authorized 3D replication system 316, 338. Such tight integration creates the highest level of security as fewer methods to steal 3D object files 114 are possible. This method also has the lowest flexibility and only one 3D replication machine 320 or 330 can be accessed at one time.

As discussed in FIG. 2 the network 308 shown can be of a very wide variety both wired and wireless. Also as previously discussed there would be the variety of links 306 used to couple all endpoints 304, 320, 330 to the network 308. The enclosure 104 around the licensee 112 can be a firewall or just a division of computers defined by a router or gateway type product. Embodiments can use different types of security and routing components.

In one exemplary embodiment rights are acquired via computer 304 to replicate a 3D object. As discussed earlier this could have happened through face-to-face negotiations or digitally using a method like purchasing rights over the Internet. In this embodiment computer 304 communicates 310 over a link 106 with the licensor 110 to access a certain 3D object for replication purposes using a given 3D replication key. The user has the choice to download an additional piece of software called the replication agent 312. The computer 304 may also be given rights to download an encrypted copy of the associated 3D object files 114 when large numbers of copies are required or simply by choice of the licensor 110. The replication agent 312 is used to facilitate the interface to the replication security firmware 318 through communications link 314. In one embodiment the 3D replication key is submitted over a communication session 314 to the replication security firmware 318 located within the 3D replication machine 320 acting as the authorized 3D replication system 316. If already downloaded the encrypted 3D object files 114 is also provided over the communication session 314. In this embodiment the replication security firmware 318 acts directly with the licensor 110 to pass secondary authentication by real time communication 314 with the replication agent 312. As files are downloaded they are passed up the communication session 314 to the replication agent 312 to be given to CAD programs or other programs. In this embodiment the replication agent 312 has to collect information about the requesting program, a CAD program wanting to open a .BLEN type file for example, in order for the characteristics to be matched against what the licensor 110 has requested.

In another exemplary embodiment the 3D replication key is submitted through the replication agent 312 through communication link 310 to the licensor 110. In this embodiment the replication agent receives the list of 3D object files 114 as illustrated by FIG. 5. Then as the user performs open requests the replication agent UI will allow CAD operations, and allow 3D render files or 3D GCODE files to be submitted to the replication security firmware. The big advantage of having the replication security firmware 318 in this embodiment is that real time feedback 314 can be given to the replication agent 312 regarding the success or failure of the replication and the ability to check 3D replication machine 320 characteristics is enhanced.

In another exemplary embodiment the replication security firmware 334 and the 3D replication machine 330 offers a user interface (UI) 332 to facilitate the manual input of the 3D replication key. In this embodiment the replication agent logic 312 is also present with the replication security firmware 334 found within an advanced 3D replication machine 330. Many 3D replication machines 330 also include status screens, physical keyboards for input and monitor dials for tracking temperature and other important information. A single enclosure, like a standalone kiosk replication machine can have several computers running side-by-side appearing as one computer. Retail-based kiosk machines can be used for 3D replication activities to average consumers to enhance their retail experience. In this embodiment the replication agent 312 is optional and only the 3D replication key is needed. As mentioned in FIG. 2 other embodiments for inputting the 3D replication key are also possible depending on the capabilities of the 3D replication machine 330. For example, a Bluetooth communication path could be supported, WiFi or an NFC tap method, are a few options. Once the 3D replication key is provided, the user may also provide the full encrypted 3D object files 114 directly to the 3D replication machine 330. This could be done by attaching a portable memory device through a USB connector, or through a mobile device via Bluetooth or NFC to name a few possible methods. It is also possible that the encrypted files have been pre-loaded on the 3D replication machine with a kiosk type product offering. Perhaps the kiosk is a shoe-printing kiosk or is offering other similar products for customization. To protect the 3D object files 114 on this machine a 3D replication key is needed to unlock and use them.

In this embodiment once the 3D replication key is provided to the replication security firmware 334 a communication path 336 is opened to the licensor 110 using configured path information. As already discussed this path information could be provided in many ways, for example, by the replication agent 312, or using information derived from the 3D replication key, through a configuration file, through a UI as shown in FIG. 5, or through some other mechanism. With a path opened to the licensor 110 it is now possible to perform the validation step and receive the final authorization. The licensor 110 performs a variety of steps for example the 3D replication key is validated, the database entry is located, the remaining replication copies allowed for this 3D object are checked along with other prescribed checks being undertaken. Once all the checks are performed, the licensor 110 sends back a message with a list of the associated 3D object files 114 to the authorized 3D replication system 334.

Now that the 3D replication key is validated the software being used can verify any primary capabilities requested by the licensor 110. As discussed this could include attaching one or more 3D replication machines 320, 330, verifying the O/S being used or many other similar checks. When these all pass the software becomes an authorized 3D replication system 316, 338. FIG. 2 provides details on additional checks and operations that can be performed on computer 304.

As the user selects 3D object files 114 to access the request is sent back 310, 322, 336 to the licensor 110. This process was thoroughly detailed in FIG. 2. If computer 304 is able to run CAD programs then the necessary monitoring could be used to allow this. If the computer is a standalone 3D replication machine 320, 330 then different options, like running a 3D slicer or just 3D replication might be possible. As detailed in FIG. 2 no matter which 3D object file 114 is selected the software being used will ensure all secondary capabilities are verified. Even if a standalone 3D replication machine 320, 330 is being used, as in a kiosk embodiment, a UI can be provided to allow various customization steps for the user before submitting the modified 3D render files 114 and 3D GCODE files 114 directly to the 3D replication machine 320, 330 for replicating. As mentioned in FIG. 2 the replication agent 312 has the ability to work in conjunction and communication 314 to the replication security firmware 318. This communication 314 further enhances security and provides greater real time feedback and audit information. Using embedded firmware like the replication security firmware 318, 334 during the 3D replication process further enhances the ability to monitor and stop the replication process. For example, at any time should the secondary capabilities fail, stopping the 3D replication makes sense. For example, if temperature reaches maximum levels that could compromise the integrity of the 3D replica the licensor 110 would not want to warrantee such a replication. Stopping the 3D replication process and providing feedback also helps the licensee 112 to reclaim another attempt at replication at a later date when the problem with the 3D replication machine 320, 330 can be identified and fixed.

As discussed in FIG. 2 during the replication process on any 3D replication machine 320, 330 information will be returned to the licensor 110 including temperature information, failure information and other statistics. When the replication is complete the final success or failure codes are returned to ensure accuracy accounting of replications and to track when all licensed replicas have been successfully completed.

Figure 4:
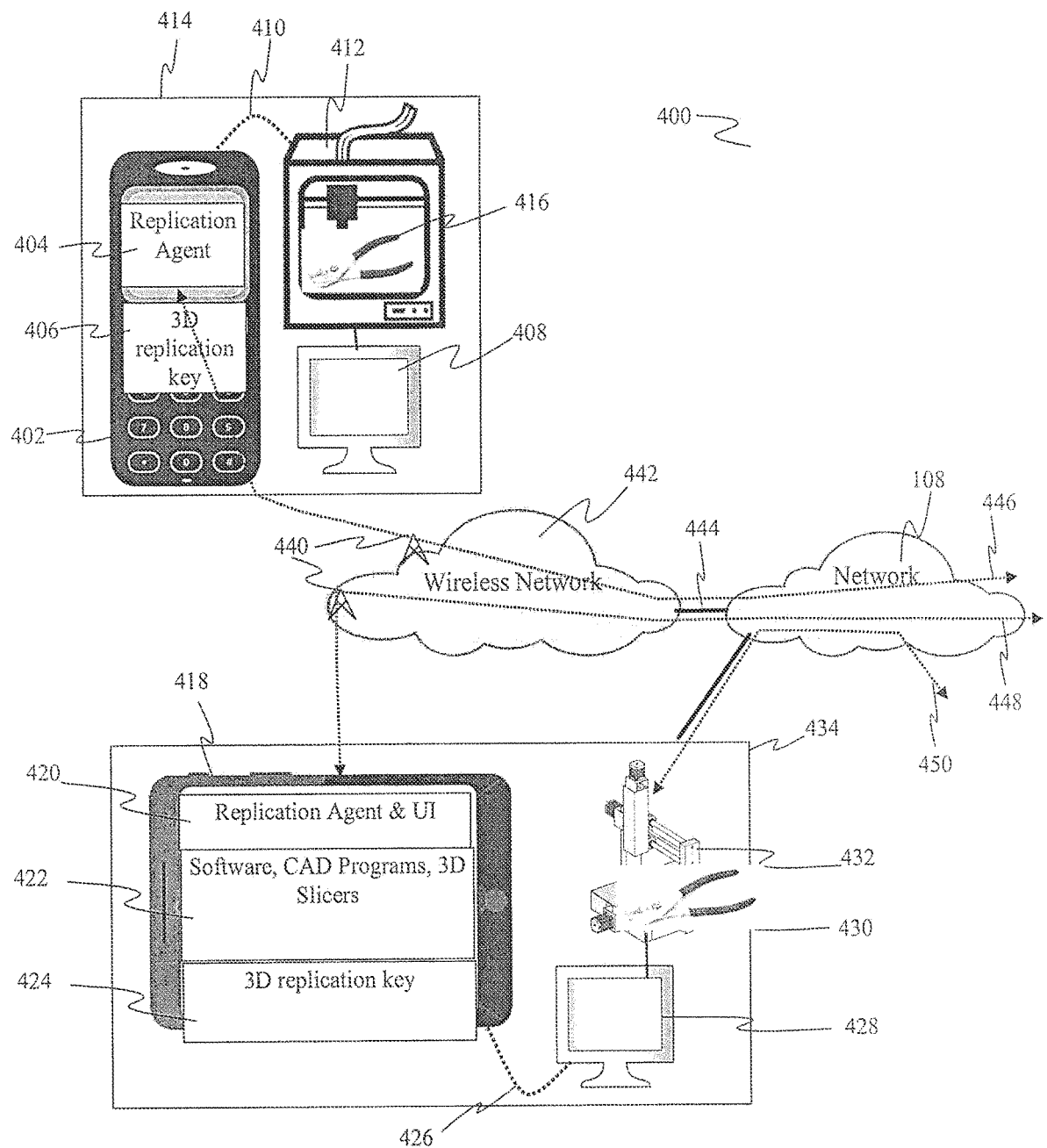
FIG. 4 is an illustration of additional exemplary embodiments involving mobile devices within the licensee's environment.

Turning to FIG. 4 there is an illustration 400 depicting additional exemplary embodiments within the licensee's 112 environment. This exemplary embodiment helps to illustrate the flexibility of the invention and the complexity and variety of installations that could exist. It is expected that there are cases in manufacturing, industrial and retail environments where wireless communications can enhance the interaction with a licensor 110. Often in legacy environments or in a retail kiosk environment connecting 3D replication machines 412, 432 to a network 108 like the Internet is not always possible. In some legacy embodiments there could even been WiFi based cameras installed to monitor the output of the 3D replication machine 412, 432. In these legacy embodiments the mobile device 402 might initiate pictures or video to track the success or failure of a 3D replication. FIG. 8 discusses this type of embodiment in greater detail.

The first exemplary embodiment depicts using a mobile device 402 like a cell phone communicating 410 to a 3D replication machine 412 to request 3D replications. The mobile device 402 uses radio frequency (RF) methods to reach a wireless network 442 to provide real-time communication access 446, 448. This channel is also used to perform all communications and real time feedback to the licensor 110 as 3D object files 114 are requested and accessed. The mobile device could include cell phones, wireless tablets, wireless laptop computers or some other advanced wirelessly enabled system. The second exemplary embodiment depicts using a tablet computer 418 with RF capabilities to communicate 426 to a 3D replication system 428, 432. The 3D replication system 428, 432 is could be made up of one or more computers co-operating to allow 3D replications. In this embodiment the 3D replication system 428, 432 are capable of opening a feedback communication path 450 to a network 108, like the Internet to provide real time feedback and audit information. In this embodiment the connected device does not have to be fully trusted and the back channel opened by the 3D replication system 428, 432 is watch dog to ensure the number of replications and all secondary capabilities are being followed.

In this exemplary embodiment a replication agent 404 has been installed on a mobile device 402 which is capable of radio frequency (RF) communications. The replication agent 404 also has the logic of the replication driver discussed in relation to the figures. In other embodiments a web browser might be used on the mobile device 402 or other similar pieces of software. Such additional applications or apps, as they are often called, are provided via an "app store". Such app stores can be accessed using mobile devices 402. Also it is possible that the replication agent 404 may have been installed earlier over the Internet 108 especially if a portable laptop is being used. The replication agent 404 is then able to communicate to the 3D replication machine 412 directly 410 or via a connected computer 408. There can be standalone 3D replication machines 412 without connected computers 408. In these configurations the 3D replication machine 412 may provide communications like WiFi or Bluetooth or similar links in order to receive printing commands and 3D renders or GCODE files 416. Therefore, communication between the mobile device 402 and the 3D replication machine 412 could be through WiFi, Bluetooth, NFC, USB connector or some other similar connection method. In other exemplary embodiments the mobile device 402 could be connected to the attached computer 408 via a physical USB connector or wirelessly via WiFi, Bluetooth or NFC.

As already discussed in previous figures the 3D replication key is provided to the software being used, like the replication agent 404 which is communicated 446 back to the licensor 110. As any primary capabilities are received by the replication agent 404 they are verified. Perhaps the type of 3D replication machine 412 is specified, the type of mobile device 402 that must be used or the O/S being used on the mobile device 402 are all checked. Once these primary capabilities are all verified an authorized 3D replication system 414 is established. In this embodiment all communications by the replication agent 404 is performed via cellular towers 440 through the wireless network 442 to the licensor 110 over a communication link 446. Coupling methods 444 between wireless networks 442 and wired networks like the Internet 108 can be performed with switches, routes and wireless address translators (NATs) that perform the necessary address mapping to allow Internet Protocol (IP) addresses to be managed and tracked.

In this embodiment once the 3D replication key is validated by the licensor 110, and all primary capabilities are verified, it is possible for the user on an advanced cellular phone 402 to download a list of 3D object files 114. As already discussed the user is then able to select different 3D object files 114 and receive any provided secondary capabilities that must also be verified. If 3D design files are requested then the CAD program could be checked, or the 3D slicer program might be check and many other checks can be performed. Once these secondary capabilities are verified the files themselves can be downloaded for opening or execution by the 3D replication machine 412. Using a mobile device 402 it might be likely that the primary focus is direct submission of GCODE files to the 3D replication machine 412. However with the growth of computing power on mobile devices 402 it is becoming increasingly possible to perform some limited CAD operations on cell phones and certainly on tablets and laptop computers. As these 3D object files 114 are accessed, modified or submitted for replication all real time feedback and audit information goes back through the communication link 410 to the software 404 being used on the mobile device 402. This is then relayed via RF to the licensor 110 for tracking, storage and monitoring.

In another exemplary embodiment a tablet device 418 establishes a connection to another 3D replication machine 432. This machine 432 may be of a different class as the first 3D replication machine 412 or it could be of the same class. For illustration purposes these wireless RF devices are shown as different but it could be the same device and same user traveling between different 3D replication machines 412, 432 trying to select the correct one to perform the replication they desire. This type of configuration might be used within a retail environment where a bank of stand alone 3D replication machines 412, 432 are available for customization of certain products, for example.

Alternatively there could be a bank of similar 3D replication machines 412, 432 and the replication machine 412, 432 that is available becomes the one that has the capability to perform the 3D replication. If the 3D replication machine types are different the replication agent 404, 420 is provided information by the licensor 110 to determine which 3D replication machine 412, 432 is capable of replicating the one or more 3D objects 114 that correspond to the 3D replication key. For example, if the completed 3D object has a metal component 430 and a rubber component 416 then one of the 3D render files 114 that make up the completed 3D object might be provided to the first 3D replication machine 412 and then the second 3D render 114 would be provided to the second 3D replication machine 432. In this way the 3D replication agent and UI is flexible enough to not proceed with 3D object file 114 download until all the capabilities are met and the 3D object has a high probability of successfully being replicated.

In this second exemplary embodiment the mobile device 418 is also connected via radio frequency (RF) to a wireless network 442 via one or more base stations 440. Such wireless networks 442 can range from GSM networks, to advanced LTE, 4G, 5G networks, 802.11 networks, Internet of things (IoT) networks and even satellite networks. Throughput on such wireless networks 442 is now reaching WiFi speeds and they have the ability to transfer large amounts of data. Over these connections communication 448 takes place with the licensor 110 as discussed in FIGS. 2 and 3.

On a tablet type device 418 the user has the ability to input or load the 3D replication key 424 into the replication agent 420. Because the mobile device 418 is able to support multiple communication strategies simultaneously the 3D replication key could have already arrived onto the mobile device 418 via text messaging (SMS) or via an electronic mail (email) message. Mobile devices 418 can receive email, SMS messages and even performing advanced Internet browsing at the same time. Therefore, the 3D replication key 424 relating to a specifically licensed 3D object may already exist on the mobile device 418. In another exemplary embodiment the licensor 110 may require manual input of the 3D replication key 424 through a UI on the mobile device 418 provided by the replication agent 420 or some other software like a browser directly. These embodiments were discussed in FIGS. 2 and 3 and illustrated in FIG. 5.

Once the software being used, like the replication agent 420 establishes a connection 448 via RF to the licensor 110 can the 3D replication key be transmitted and verified. As discussed once the licensor 110 performs all verifications on the 3D replication key the primary capabilities are received and verified by the replication agent 420. If requested, a connection 426 to the 3D replication machine 432 is established. It might also verify the mobile device type 418 and the O/S being used. Once all primary capabilities are verified an authorized 3D replication system 434 created. With the authorized 3D replication system 434 created the replication agent 420 allows the download of a list of 3D object files 114 associated to the 3D replication key. As illustrated in FIG. 5, with the list of 3D object files 114 the user can select and open the files they wish to work with. On an advanced tablet computer 418 it is likely that many more CAD programs and 3D slicers 422 can be easily used to modify and customize certain parts of a 3D object before replication. Such programs 422 can also be run within web a browser for 3D slicer technology. As already discussed for each 3D object file 114 that is requested the capabilities of the requesting program or device are validated by the licensor 110 before final access is granted to the 3D object file 114.

In this embodiment after primary capabilities are verified the licensor 110 knows which 3D replication machine 432 the replication agent 420 is connected 426 to. This allows them to now open and associate a communication path 450 to this replication agent 420. Such associations are handled through database entries and software tables. This allows the licensor 110 multiple options for download any requested 3D object files 114.

In one embodiment once all secondary capabilities are verified, the licensor's 110 system could provide the file directly to the software being used 420 on the mobile device 418 over the RF link 450. This can be used for delivering 3D design files or 3D object files that might require a 3D slicer program. In another embodiment the 3D object files 114 could be downloaded over the 3D replication machine's 432 communication path 450. In this embodiment the 3D replication machine 432 acts as the control point for 3D object files 114 and keeping them secure. In this embodiment the replication agent 420 might then request the file from the 3D replication machine 432 for CAD manipulation and modification. Such a 3D design file might then be re-submitted for 3D replication once the modifications were complete.

For accessing the 3D object files 114 in both embodiments the replication agent 404, 420 requests the download of the licensed 3D object files 114 or the encryption key to unlock the one or more 3D object files 114. When the licensor 110 allows the licensee 112 to possess the one or more 3D object files 114 it is possible that the encrypted 3D object files 114 could easily reside on the mobile device 402, 418 given today's storage capacities for such mobile devices 402, 418. Most mobile devices and handheld computers 402, 418 also offer microSIM cards and other removable memory cards, these removable memory cards would also be a method for exchanging and providing one or more encrypted 3D object files 114 for replication. These storage methods would reduce expensive over-the-air downloading of 3D object files which can be large in size. In another exemplary embodiment the 3D object files 114 already reside on the 3D replication machine 412, 432 and the replication agent 404, 420 is provided the encryption keys to unload these files when the 3D replication key 406, 424 is validated. Or as discussed are downloaded to the 3D replication machine 432 over a land line communication path 450 thus reducing expensive over-the-air costs.

As in FIGS. 2 and 3 as the 3D replication machine 412, 432 completes its work prescribed statistical, status, temperature and completion information is related back to the licensor 110 or to other authorized third parties. This can include additional audit information regarding the user, location, time, machine owner and serial number information to allow for advanced tracking of 3D replicated objects and can also include Analytics Data. Analytics Data is created by correlating the completion data with the original 3D object information provided by the licensor 110. As described in one embodiment the 3D replication machine 412 must use the mobile device 402 to communication 446 this information, while in another embodiment the 3D replication machine 432 can use a dedicated direct communication path 450.

Turning now to FIG. 5 there is an illustration of an exemplary 3D replication software screen 500 that depicts some of the elements described within this patent application. Although this screen 500 is detailed it is just one possible representation and has been tailored to an easily depictable format for this application. For example the menu items for taking action 504 do not show a sub-category of selection. These sub-actions will be described in detail. The number and permutations of screen layouts can be finite.

First shown is the name of UI and its version number 502. This could be an Internet browser add-on or web site interface or a program running on a computer. Alongside of this the user can select from actions to be taken 504 to perform operations. This opening area might be followed by a current status area 508, 506. This might show the number of 3D replication machine that have been found and associated to the 3D replication software 502. It might show a range of information about these machines, including but not limited to their current status, their make, model and manufacture, information about the material loaded within them and the amount of material remaining and many other such values. The user might be able to hover over the printer and an additional overlay window could appear showing this information as well.

One of the first steps would be to enter a 3D replication key 510 or a licensor's location 512 to facilitate the process of finding 3D object files 114 to act upon. This might assume the user has already found a site, purchased the rights to replicate a 3D object and has thus acquired a 3D replication key 510. During this process they also have been given the Internet 108 address to enter to find the correct Licensor or Licensing Agent 512. There can be consolidation sites for 3D objects and Licensing Agents 512 may be built into the software and presented without the need for additional input. As discussed this results in the download of primary capabilities to be verified. The status area 522 might prompt the user with information like attach a given 3D replication machine or other such requirements to be fulfilled. Attached a 3D replication machine can be performed using the 'Associate' 504 menu item in this example interface. For example in most O/Ss these associations can be done automatically by allowing the software to search the Intranet for connections to any printers and 3D printers on the Local Area Network (LAN). Once found the user can then select which machine they wish to add 506 to the 3D replication software 502. They could also enter a specific network address, like \\local-office\marketing\machine-xxx\shared-3D-Printer-MoJo. These types of network addresses can be used when connecting software programs to available printers or when adding printers to print spooling type programs. In another exemplary embodiment the 3D Replication Software 502 invokes a print spooler interface and presents the current list of associated printers for this workstation to the user. The user can then select one or more of these printers to associate to the 3D replication software 502. The user must then respond to these requests and any other requests to verify O/S, software versions and the like to pass the primary capabilities check.

Once the primary capabilities are verified, for example when at least one 3D replication machine 506 has been found, stage one authorization can be considered complete 508. With an authorized 3D replication system established the list of 3D object file 516 can be displayed for the user. By using the UI interface 504 the user can then perform different operations. The requirements or characteristics 518 of each 3D object file 516 is also presented to the user These characteristics help inform the user as to what type of 3D object file it is and then direct them to what is required to access this 3D object file. Once they understand the number and types of files they can then use the UI to 'Select' 504 which of the 3D object files 516 they wish to access. In this exemplary embodiment this could be a process as the original licensor 110 might offer the user several selections to deal with different environments and different skill and ability levels.

In this simple illustration of 3D object file 516 the user has purchased rights to replicate a pair of Nike shoes. They have a 'Sole' a 'Top' and a bottom 'Tread'. As this is only an example it is understood that in real world case there could be many more 3D object files and a wider variety of choices.

In this example the user has two 'Sole' selections that work with CAD programs. The user has decided to select the second .BLEN 3D object file and an indicator 520 shows that it has been selected. This minor customization might be allowed by the licensor 110 so that the user can improve the instep and orthotic for the shoe to create the perfect custom interior for the person's unique foot shape.

The user has been given two different 'Tops' to pick from a high top shoe and a low top shoe. The user has selected the 'Low Top' shoe and will be allow to adjust how slices are presented to the 3D replication machine by feeding the .M3F file into a 3D slicer like Slic3r or SliceCraft, for users. Giving the user control over this component could improve the look and feel of the resulting 3D replication output. Finally the user has been presented with two .GCODE files that have already been through 3D slicers and are designated for one of two types of 3D replication machines. The user has selected the 'MakerBot Replica' as it turns out it is associated already 506 to the 3D replication software 502. As mentioned this could be an iterative process while the user figures out what elements they have within their network that meet the needs for replication.

As the user goes through selecting 520 3D object files 516 they are provided with a status screen 522 to inform them how they are doing with the process. This effectively makes up the secondary authentication stage where the specific characteristics of the necessary item is checked and compared to the required characteristics. For example as illustrated 522 the .BLEN (Blender program needed to edit the 3D object file) is too old and an updated version is required. The user can then pause this process, go and update their Free version of Blender and re-select the same 3D object file and try again. The example then shows the .M3F file requested by the SliceCraft program was opened successfully and the user can then go to that interface and can work with the image to begin the 3D slicing process. Finally the .GCODE file request is still in process as the 3D replication software 502 interacts with the 3D replication machine to determine that it has all the necessary characteristics to proceed with .GCODE download. As mentioned in earlier figures the 3D replication software 502 might facilitate this through an installed specialized device driver or through embedded software directly within the 3D replication machine's memory.

Figure 6:
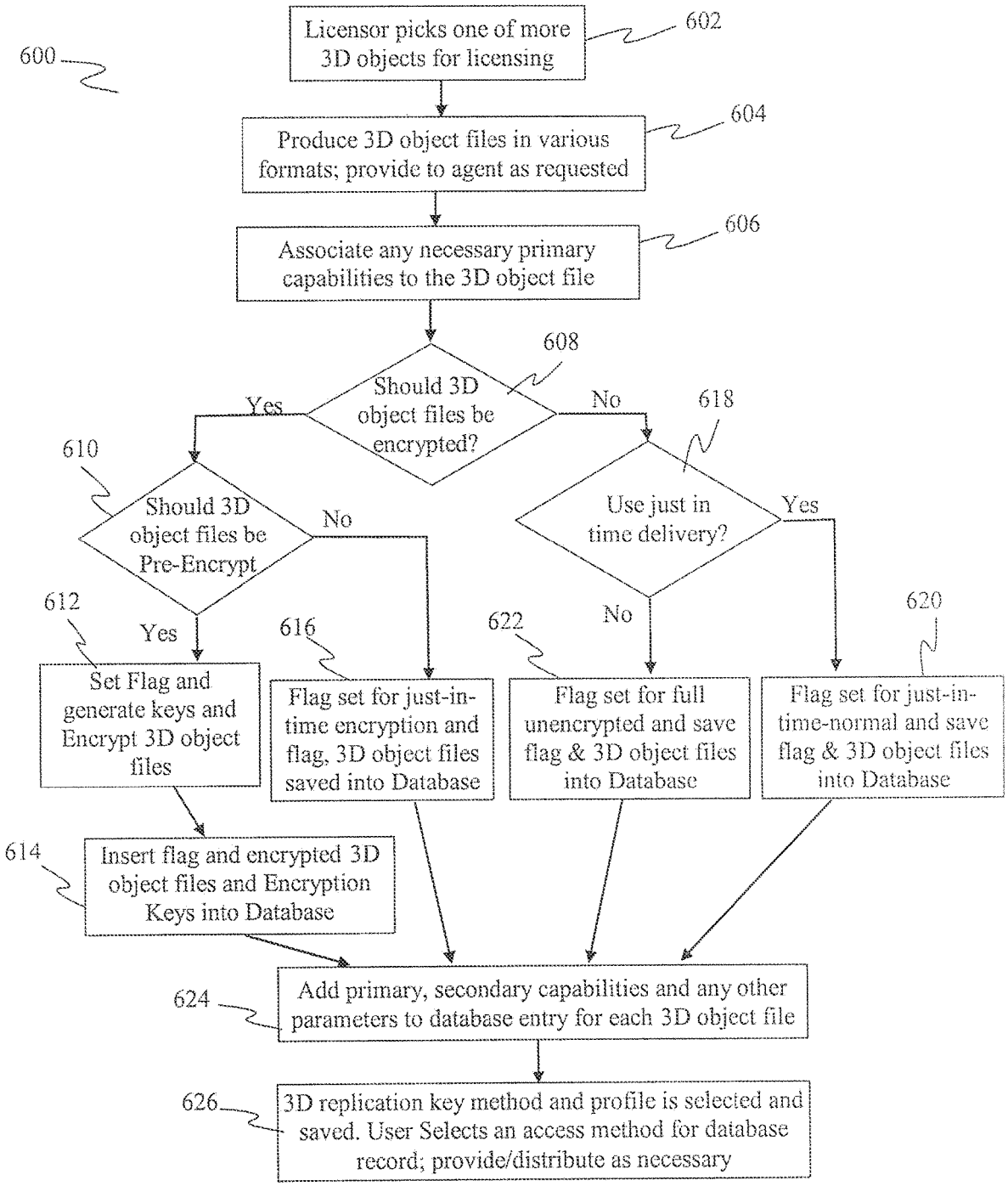
FIG. 6 is a flow chart illustration of the exemplary steps on the licensor system to prepare 3D objects for licensing and replication.

Turning now to FIG. 6 there is a flow chart 600 that illustrates exemplary steps for the licensor 110 system to prepare 3D objects for licensing and replication. Initially the licensor 110 picks one or more 3D objects that they wish to make available for licensing or sale 602. A licensor 110 would have created these 3D designs from 3D objects they own and have intellectual property (IP) rights over. Each selected 3D object will correspond to one or more 3D object files that represent the final components that make up a given 3D object. The licensor 110 then produces various 3D object files 604 to match formats. For example depending on the target audience the licensor 110 might want to have a wide range of 3D CAD formats, 3D render formats and 3D GCODE formats to make up their 3D object files to enhance purchase and download. For example, there could be CAD formats for the Blender CAD software (.BLEN) or Autodesk CAD software (.FBX or .3DS) or render formats like stereolithography (STL), Virtual Reality Modeling Language (VRML), MakerBot 3D formats (.X3G) and CNC format like Drawing Exchange Format (DXF), or newer formats like Additive Manufacturing File Format (AMF) or others with more advanced capabilities and also there could be files that have been 3D sliced for specific 3D replication machines (.GCODE) with attached capabilities to identify which 3D replication machine to use. As discussed earlier the licensor 110 can then decide if they wish to provide these one or more 3D object files to a license agent 110. When transferring to a license agent 110 there are many ways to provide these 3D object files to the licensing agent. In one exemplary embodiment the 3D object files would be exchanged through a secure TCP/IP connection over the Internet to a consolidation web site run by the license agent.

With the selection of the 3D object to license the licensor 110 must also decide on those primary capabilities that must be verified before the licensee 112 can even see a list of files or download any associated 3D object files 606. These primary capabilities are considered the broad capabilities and can range to which types of 3D replication machines must be present, what type of printing material is in the 3D replication machine to what O/S is installed and being used. There can be some overlap of primary and secondary capabilities, for example the type of material within the printer heads of the attached 3D replication machine can be checked immediately or only after a specific 3D object file is requested. Further detailed checks can be added to the secondary capabilities associated to individual 3D object files, for example how much printer material is left in the heads of the 3D replication machine being used to replication a given 3D object. These primary capabilities are associated 606 to the 3D object file and will eventually save in the database.

Whether the 3D render files are kept by the original licensor 110 and owner or given to a licensing agent 110, a decision must be made as to how the 3D object files will be provided to the ultimate licensee. There are several methods for exchanging the 3D object files that are disclosed in this application and others that would also be possible. The first step is to decide if the 3D object files should be encrypted 608. As already discussed there could be many 3D object files grouped to make a single 3D object or there could only be one. If the desire is to encrypt the 3D object file 610, then there are two methods for encryption so it must be decided which method will be followed. If the 3D object files are to be pre-encrypted 610, it means each encrypted 3D object file can be downloaded all at the same time. In this case an encrypted flag is set, an encryption key is generated and the 3D object files are encrypted 612 using it. The encrypted 3D object files and encryption flag are then inserted into the database with the encryption key 614.

If the 3D object file is not to be pre-encrypted, then a flag is set to indicate that a just-in-time encryption method will be used 616. The just-in-time encryption method means that an encryption key will be negotiated at the time the user requests the 3D object files for access. In this case the just-in-time encryption flag is set and the flag and all the associated 3D object files are then inserted into the database 616.

If the licensor 110 decides 608 not to encrypt the 3D object files there are other methods that can be used 618. The licensor 110 may wish to use a just-in-time delivery with the unencrypted 3D object files 620. If a just-in-time delivery method is desired the just-in-time-normal flag is set and then the flag and 3D object files are then saved into the database 620. If the licensor 110 does not want just-in-time delivery, then the flag is set for full unencrypted delivery 622. The flag and the 3D object files are then saved in the database 622.

Finally, to complete the database entry for the one or more 3D object files any required additional primary and secondary capabilities are added 624. The primary capabilities have already been discussed earlier. The addition of secondary capabilities allows an authorized 3D replication system to check for a wide range of requirements for allowing final access to the 3D object files. The capabilities will range depending on the file type. For example for 3D design files there might be a specific CAD program or programs allowed to open the file. The CAD program or programs may need to have a specific revision and update level to exist 624. In other examples if the file type is a 3D render file the 3D printing material types, material printing levels, temperature parameters required to print a given 3D printing material and any other prescribed parameters to ensure that the final replica complies with the specifications and meets the quality, reliability and warranty levels required 624. If the 3D object file is a .GCODE file that has already been 3D sliced and can be directly submitted to a specific 3D replication machine the machine type, model, make and manufacturer might be associated to the file 624. Each 3D object file's capabilities will assist the 3D replication agent to select which 3D components should be allowed to access the file in order to produce the best possible 3D replication outcome.

Now that the database entry is complete the licensor 110 picks the type of 3D replication key access method and profile attributes they wish to use for accessing their 3D object files 626. Once this 3D replication key method is decided it is also saved in the database with the 3D object file. Once a license to replicate is granted by the licensor 110 the 3D replication key effectively acts as an access method to retrieve the database entry for the one or more 3D object files 626.

Several methods have been disclosed throughout the document but other advanced methods would be possible depending on the situation and requirements of the system. For example, the licensor 110 might decide to simply use the database key directly as the 3D replication key 622. In this embodiment this would indicate a one-for-one relationship between the one or more 3D object files in the database and a 3D replication key for all licensees'. In another embodiment the licensor 110 might decide to use a transaction key as the 3D replication key 622. In this embodiment a separate transaction database would be established and the database key would be associated with a given licensing transaction for the one or more 3D object files 622. In this embodiment the 3D replication key would vary between different licensee's and would not repeat.

In other exemplary embodiments a security token method can be used to associate the database record to a security token or authentication token and it's constantly rotating password readout value. Using a security token database allows the database key for the 3D object files to be associated with a security token for later use. Similar systems can be used for RFID tokens and USB keys to create a one-time password method for accessing the 3D object files 626. Depending on what is installed and being used by the licensor 110, the licensor can select their preferred method and this selection will be saved into the 3D object file database 626.

The user also must configure the type of attributes the 3D replication key will have 626. The 3D replication key may have a life span and expire after several hours, days, weeks or months. The 3D replication key may have the ability to be exchanged or not exchanged and/or it could be tied to a specific person like a bio-key. It could be tied to the fingerprint or some other distinguishing mark or trait of the user. This might be important, for example, when 3D organs replication or tissue replication are involved.

Figure 7A:
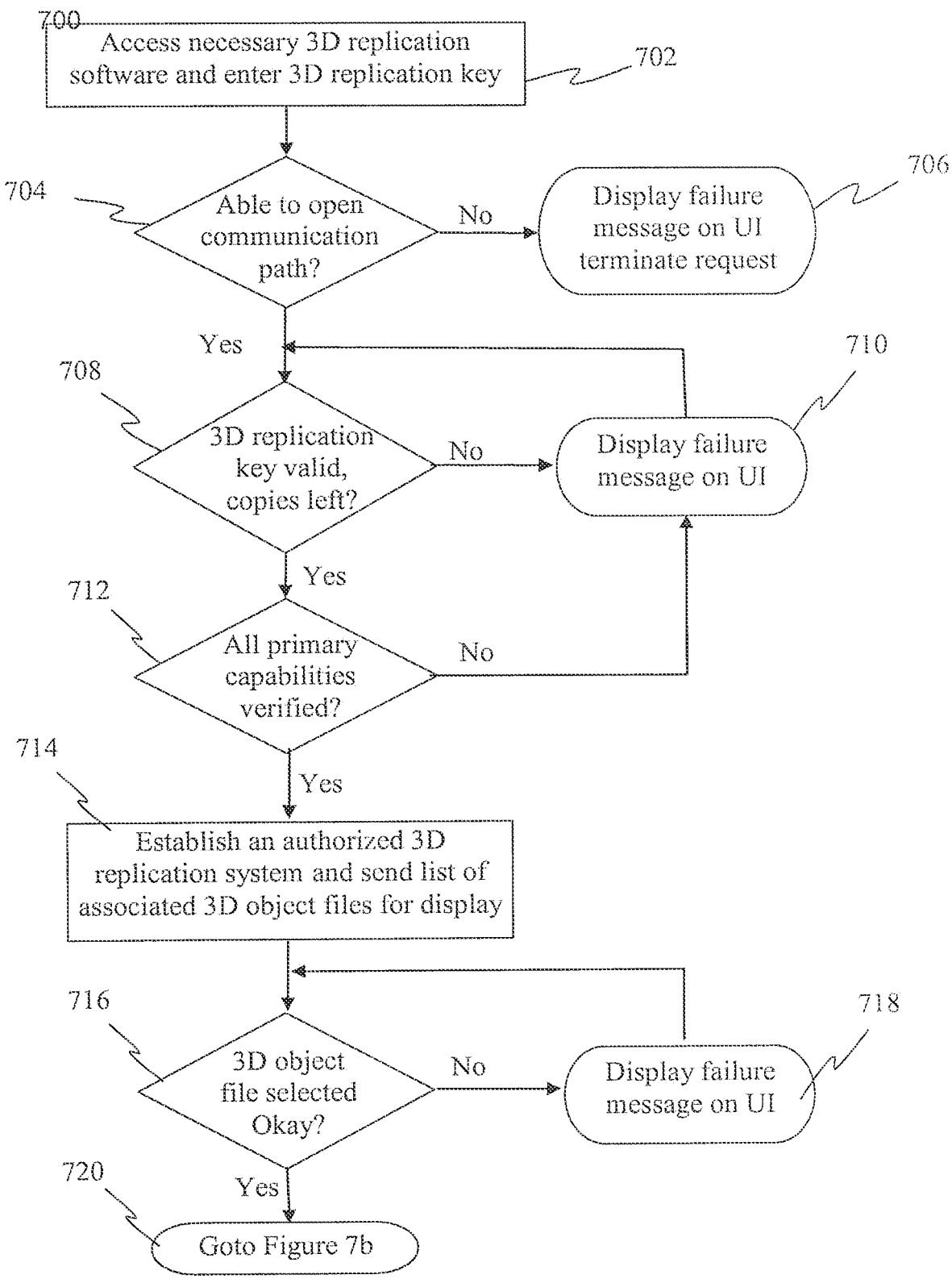
FIG. 7a is a flow chart illustration of the exemplary steps for the licensee to input the 3D replication key in order to access 3D object files.

Turning now to FIG. 7*a* there is a flow chart 700 that illustrates the exemplary steps for the licensee to input the 3D replication key in order to perform a replication. It is assumed that the licensee 112 has already acquired licensing rights to reproduce a given 3D object. As discussed throughout this patent this can occur over digital means, through face-to-face negotiations, through an online credit card transaction, by purchasing a given 3D replication machine or through many other means.

The licensee 112 first installs or gains access any necessary 3D replication software into their system 702. If they have purchased a 3D replication machine that has the replication security firmware already installed, they can simply confirm that by checking the machine. They can also download a replication agent or replication driver onto their system to enable the creation of an authorized 3D replication system 702. They could be running a browser add-on or a web site with specific 3D replication features. Once the replication software is accessed the licensee 112 they can enter a 3D replication key into the interface provided. There have been many methods of exchange of the 3D replication key previously discussed, for example using Bluetooth, NFC or manual keystroke input. The 3D replication key acts as confirmation that replication rights do in fact exist and is used to track those rights. There are many ways the licensee 112 may have received the 3D replication key. If displayed on a screen for example they may have written down the 3D replication key, they may have received it during face-to-face negotiations, they might have found it written in a user's guide for a given 3D replication machine, or it may have come to them through email or SMS text messaging just to name a few methods 702.

The replication software then attempts to open a communication path 704 to the licensor 110 to perform a series of checks on the 3D replication key and to allow real-time verification and tracking during the course of any replications that occur 704. If the communication path cannot be opened a failure message is provided on the UI and the process is terminated 706. If the communication path is opened successfully the licensor 110 then confirms the 3D replication key is valid, that replication copies are remaining and performs any other specified final checks for the 3D object desired 708. If the 3D replication key is invalid, or there are no replications left for the 3D object associated with this 3D replication key then an error message is displayed on the UI and the user can attempt to enter another 3D replication key 710. It could be that a typing mistake was made, or perhaps the user has several 3D replication keys they are testing or many other reasons could exist why the user would want to try again. For each failure a record is kept by the licensor 110 and if excessive attempts are made on the same invalid 3D replication key action can be taken. The licensor 110 might even record the error message and offer the licensee 112 additional copies or tell them the copies they have licensed have all be used up. This could occur through the UI provided to the user and depending on how they acquired the first license they could be taken back for example to enter their credit card information again.

With the 3D replication key validated a confirmation message is received and the licensee 112 and any additional primary capabilities can be verified 712. For example the primary capabilities might require the licensee 12 to associate one or more 3D replication machines to the 3D replication software. The steps to perform will vary for every installation but several methods have been disclosed throughout the earlier figures. For example in with many operation systems (O/Ss) they can type in the network name of the 3D replication machine or perform a network wide search for 3D replication machines. In standalone environment they could communicate with the 3D replication machine over WiFi or Bluetooth or alternatively they could connect physically to it over a Universal Serial Bus (USB) connection or some other higher-speed physical link. Once at least one or more 3D replication machines are attached and identified as available the installed 3D software become an authorized 3D replication system. Additional primary capabilities have also been disclosed around O/S type and version, maybe GPS location on the globe, perhaps IP address and its association to a country and other broad capabilities can be verified 712. If the primary capabilities cannot be verified then an error message is displayed 710 and the software returns to allow enter another 3D replication key or perform other steps to satisfy the primary capabilities.

With the 3D replication key verified and the primary capabilities verified an authorized 3D replication system is established 714. Now the replication software can present a list of the 3D object files associated to the 3D replication key 714. Through the UI provided the user selects which 3D object files they wish to work with, for each selected 3D object file the system perform a secondary capabilities check 716. The secondary capabilities check can include another check that a certain type of 3D replication machine is present. Even though some 3D replication machines were associated to the replication software during the primary capabilities check additional 3D replication machines might be required for other parts of the 3D object files 114.

As discussed this secondary capabilities check is closely related to the 3D object file selected, i.e. different types of 3D object files will result in different types of capabilities to be checked. If a 3D design file, like a .BLEN file is selected then a free CAD program called BLENDER is needed to open and work on that file. The system has several ways to verify capabilities like the software name, its version and its revision. In some O/S systems it could go to the system registry and look into these settings. If the program has been associated to the file by the user as discussed in earlier figures, then when the program is launched it can share that information.

If the file is a 3D render file or a 3D GCODE file then a verification of secondary capabilities within a 3D slicer program or within a 3D replication machine might be preformed. Even if the opening 3D render file is going to a 3D slicer program it will immediately be submitted to a 3D replication machine. The licensor 110 might have also specified the secondary characteristics of the necessary 3D replication machine needed once 3D slicing is complete. In the case of a GCODE file this could have very specific characteristics to be present in order for a successful 3D replication. Some of these characteristics could include areas like the make, model and manufacturer of the 3D replication machine, the class or type of machine required, the type of printing material being used, the amount of printing material remaining, the temperature of the 3D replication machine, the temperature and other environmental variables of the room housing the 3D replication machine along with other prescribed capabilities 716.

For each selected 3D object file if the validation for any of these capabilities is unacceptable then an error message is displayed to the licensee and they are returned to the UI to allow them to make other selections 718. It is expected that this could be an iterative processes and first-time users will understand the system requirements process as they test each file 716. With an error message displayed in some form of status area, the user can then return to make other 3D object file selections 718 that will once again be checked for compatibility. All failure occurrences result in a message being sent back to the licensor 110 to record and correlate for analytic information. This might be useful when dealing with 3D replication machine manufacturers or a future licensee 112.

If the 3D object file selected does pass the capabilities check then the process of gaining access to the file can commence 720. In this case the data flow moves to FIG. 7*b* to illustrate additional steps.

Figure 7B:
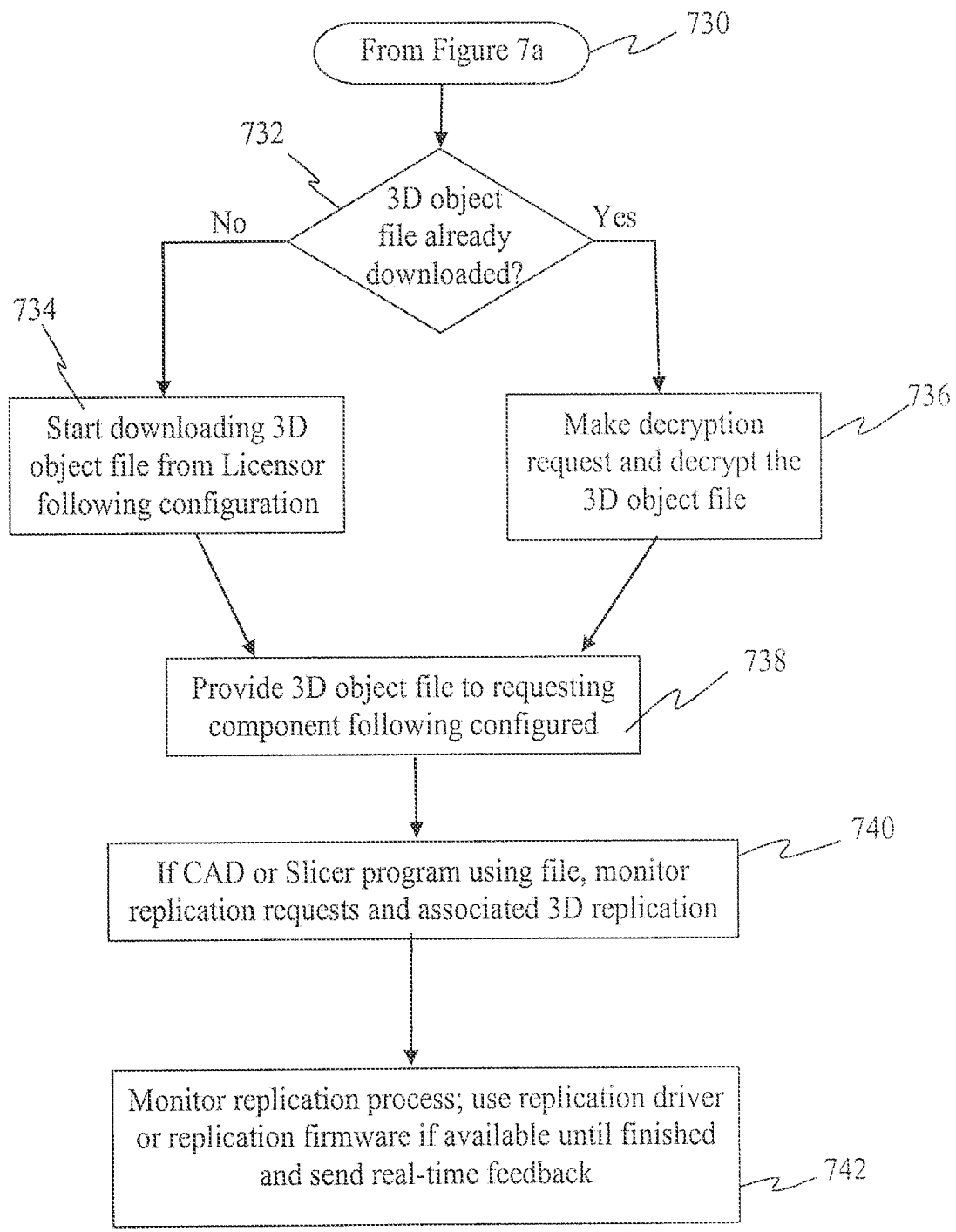
FIG. 7b is a continuation flow chart from FIG. 7a illustrating additional steps for the licensee while accessing and manipulating the authorized 3D object files.

Turning now to FIG. 7*b* there is a continuation flow chart from FIG. 7*a* illustrating additional steps for the licensee 112 while accessing and manipulating the authorized 3D object files. Once access is granted to the 3D object file 730 the authorized 3D replication system checks to see if the 3D object file has already been downloaded 732. If it has been downloaded, then a request is made for the encryption key in order to decrypt the 3D object file 736. If the 3D render has not yet been downloaded 734 then the download of the 3D render from the licensor 110 can commence 734. The authorized 3D replication system will follow exactly the configuration established by the licensor 110 when they set up the database entry as described in FIG. 6. This could be a delayed download of the entire encrypted 3D object file, it could be a just-in-time streaming method of unencrypted portions of the 3D object file, it could be a just-in-time streaming method of encrypted portions of the 3D object file or some other advanced download method which helps ensure the safety and security of the one or more 3D object files 734.

With the one or more decrypted 3D object file available, they are then provided to the requesting component 738. It will provide this file in a manner configured by the licensor 110. If the file accessed is a 3D design file it might be provided in its entirety to the requesting CAD program. In other embodiments there could be special divisions in the 3D design file that allow it to be edited in different parts to further protect the entire 3D design. If the file is a 3D design file 738, then the authorized 3D replication system might perform careful monitoring of all associated 3D replication machines to record all replication requests from such CAD programs 740. If the 3D object file is a 3D render file then it could be sent directly to 3D slicer software 738. If 3D slicer software has requested the 3D object file then careful monitoring of the associated 3D replication machines 740 can be performed to keep track of every replication. This kind of advanced monitoring is part of the reason the 3D replication machines were associated to the 3D replication software originally. As discussed earlier if the licensor 110 knows that it is possible to only replication a given 3D object on a given 3D replication machine they are able to make connecting to such a machine mandatory. There are different techniques available to installing advanced system software that monitors the activity of a computer system or of one or more software programs.

Additionally the 3D render file or a 3G GCODE file could be submitted directly to a 3D replication machine, following normal 3D replication processes 742. Usually with any 3D replication machine there is limited capacity within internal buffers for data, so the 3D replication data proceeds as fast as the 3D replication machine can process it. The authorized 3D replication system following the configured download and decryption method requested by the licensor 110 will decrypt the 3D object file as needed and submit it as requested to the 3D replication machine 742. Depending on the 3D object file requested these buffering methods within 3D replication machines can work very well with a just-in-time streaming download method.

In all cases no matter how the one or more 3D object files are received, the authorized 3D replication system then tracks progress including but not limited to areas like: design time, overall activity of the 3D object files, statistics on open, close and modification types, print statistics, temperature and any other vital information available to provide back to the licensor 110 system for storage and recording 742. This information can include Analytics Data and the information can be shared with authorized third parties as well as the licensor. The final 3D replication information is also related back 742 to ensure that careful tracking of the total number of replication is tracked and followed. As discussed in background section the licensor 110 could also use a collection or tracking agent to deal with excessive volumes of information. This collection or tracking agent could then be programmed to relay a final summary message upon completion of the replication.

FIG. 8 there is an illustration 800 of an example detailed view of the elements within a licensee's environment including a replication monitor and external monitoring devices. In this embodiment computer 802 is running the replication agent logic 804 on a network 808. The network 808 has been discussed in detail within previous figures and could be wired, wireless or a combination of the two. The replication agent logic 804 could be embedded within another software program or running standalone. It works in conjunction with replication monitor logic 814 running on computer 812.

As discussed in previous figures the replication agent logic 804 receives and verifies the 3D replication key through communication link 816 to the licensor 110. The network 808 reaches the licensor 110 through link 810 which could be wired or wireless. Depending on the range and scale of the capabilities of the licensee's system 112, verification of the system can occur with the help of the replication monitor logic 814. Communication 818 is established and used once both pieces of software have been installed and have been made aware of each other. In some embodiments without this communication link 818 no 3D replication can take place. In this embodiment the replication monitor logic 814 might need to establish a communication link 832 to an external device like a camera 830. There are many embodiments for external devices that might be used for example a temperature gage, a vibration detection device, a thumb scanner, a infrared scanner, a many other external device that can assist in the monitoring of activities on 3D replication machine 822. In some embodiments infrared scanners can detect weak joints in the 3D printing process and provide feedback to the licensor 110 to help with warranty issues. In other embodiments the camera or other external monitoring device might use a WiFi 434 or wireless signal like Bluetooth 434 or Near Field Communication (NFC) 434 to communicate with the network 808. These types of external monitors 830 can be used with legacy 3D replication machines 822 where advanced features and monitoring do not yet exist.

In one embodiment after the replication agent logic 804 confirms all capabilities are present an authorized 3D replication system 826 is created. With all capabilities verified and an authorized 3D replication system 826 created the 3D object files can be downloaded and a 3D replication can be attempted 824. The replication monitor logic 814 uses all methods available to monitor the submission of any 3D files to the 3D replication machine 822 and can proceed to gather information, statistics, images, heat signatures and video and feed this information back to the licensor 110. This might go through the replication agent logic 804 over the communication path 818 or it could go directly to the licensor 110 from the replication monitor logic 814 if a communication path exists for this purpose. The pervious figures illustrated such a path could exist for this direct communication.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

The invention claimed is:

1. An authorized 3D replication system comprising:
a data storage device storing 3D replication software connected in real-time to a licensor device having 3D object files; and
a processor coupled to the data storage device, wherein the processor executes the 3D replication software to:
establish and maintain a secure communication path from a licensee device to the licensor device,
receive a 3D replication key at an interface, the 3D replication key for replication rights of a licensee to replicate the 3D object files;
confirm the replication rights of the licensee to replicate the 3D object files by validating the 3D replication key using the communication path;
list, using the interface, a set of the 3D object files corresponding to the validated 3D replication key for the replication rights of the licensee to replicate the 3D object files;
verify capabilities of 3D replication components to replicate the selected one or more 3D object files of the set of the 3D object files according to licensor replication requirements;
protect the 3D object files using one or more encryption keys, the one or more encryption keys being different than the 3D replication key, the 3D object files comprising one or more encrypted 3D object files; and
connect to one or more 3D replication components as authorized by the licensor device to create the authorized 3D replication system;
wherein the authorized 3D replication system tracks and reports replication activities of the one or more 3D replication components using the 3D replication software to:
permit limited access by the licensee device to the selected one or more 3D object files of the set of the 3D object files as allowed by the licensor device to initiate a replication process of the selected one or more 3D object files;
monitor access of the selected one or more 3D object files in a decrypted state, wherein the 3D replication key is not used to perform decryption of the one or more 3D object files; and
transmit real-time feedback messages to the licensor device related to monitored activity on the selected one or more 3D object files and the replication process by the one or more 3D replication components to provide feedback to track success or failure.

2. The system of claim 1 wherein software program access includes modification and encryption of modifications to the selected one or more 3D object files.

3. The system of claim 1 wherein the software program access includes programs that enable 3D replication via 3D replication machinery.

4. The system of claim 1 wherein the processor validates a licensee's computing environment for compatibility through the established communication path prior to listing the set of 3D object files.

5. The system of claim 1 wherein the processor verifies a set of primary capabilities received by the licensor device.

6. The system of claim 1 wherein the processor selects, at the interface, one or more customizations to the selected one or more 3D object files and initiates the replication process of the one or more customizations to the selected one or more 3D object files to create a customized 3D object.

7. The system of claim 1 wherein the processor links one or more 3D replication machines providing the one or more 3D replication components to create an authorized 3D replication system for replication of the one or more 3D object files.

8. The system of claim 1 wherein the processor receives a final authorization that there are remaining copies of the one or more 3D object files available for replication.

9. The system of claim 1 wherein the processor verifies the capabilities by determining that the one or more 3D replication components have a type and an amount of material for the replication process.

10. The system of claim 1 wherein the 3D replication software is embedded within 3D software components.

11. The system of claim 1 wherein the processor selects, at the interface, one or more customizations to the selected one or more 3D object files and initiates the replication process of the one or more customizations to the selected one or more 3D object files to create a customized 3D object.

12. The system of claim 1 wherein the processor validates the 3D replication key using the communication path to identify a licensed 3D object using the 3D replication key; determines there are remaining replications for the licensed 3D object; and determines that the set of the 3D object files is associated to the licensed 3D object.

13. A method for controlling hardware components of an authorized 3D replication system, the method comprising:
storing, on a data storage device, 3D replication software connected in real-time to a licensor device having 3D object files;
executing, using a processor coupled to the data storage device, the 3D replication software;
establishing and maintaining a secure communication path from a licensee device to the licensor device,
receiving a 3D replication key at an interface, the 3D replication key for replication rights of a licensee to replicate the 3D object files;
confirming the replication rights of the licensee to replicate the 3D object files by validating the 3D replication key using the communication path;
listing, using the interface, a set of the 3D object files corresponding to the validated 3D replication key for the replication rights of the licensee to replicate the 3D object files;
verifying capabilities of 3D replication components to replicate the selected one or more 3D object files of the set of the 3D object files according to licensor replication requirements;
protecting the 3D object files using one or more encryption keys, the one or more encryption keys being different than the 3D replication key, the 3D object files comprising one or more encrypted 3D object files;
connecting to one or more 3D replication components as authorized by the licensor device to create the authorized 3D replication system;
using the authorized 3D replication system and the 3D replication software to track and report replication activities of the one or more 3D replication components;
permitting, using the 3D replication software, limited access by the licensee device to the selected one or more 3D object files of the set of the 3D object files as allowed by the licensor to initiate a replication process of the selected one or more 3D object files;

monitoring access of the selected one or more 3D object files in a decrypted state, wherein the 3D replication key is not used to perform decryption of the one or more 3D object files; and transmitting real-time feedback messages to the licensor device related to monitored activity on the selected one or more 3D object files and the replication process by the one or more 3D replication components to provide feedback to track success or failure.

14. The method of claim 13 further comprising receiving modification to the selected one or more 3D object files and encrypting the modifications to the selected one or more 3D object files.

15. The method of claim 13 further comprising validating a licensee's computing environment for compatibility through the established communication path prior to listing the set of 3D object files.

16. The method of claim 13 further comprising verifying a set of primary capabilities received by the licensor device.

17. The method of claim 13 further comprising selecting, at the interface, one or more customizations to the selected one or more 3D object files and initiating the replication process of the one or more customizations to the selected one or more 3D object files to create a customized 3D object.

18. The method of claim 13 further comprising linking one or more 3D replication machines providing the one or more 3D replication components to create an authorized 3D replication system for replication of the one or more 3D object files.

19. The method of claim 13 further comprising verifying the capabilities by determining that the one or more 3D replication components have a type and an amount of material for the replication process.

20. An authorized 3D replication system at an interface that receives a 3D replication key, the system comprising:
a data storage device storing 3D replication software;
a processor coupled to the data storage device, wherein the processor executes the 3D replication software to:
establish and maintain a communication path from a licensee device to a licensor device;
receive a 3D replication key at an interface, the 3D replication key for replication rights of a licensee to replicate the 3D object files;
confirm the replication rights of the licensee to replicate the 3D object files by validating the 3D replication key corresponding to replication rights of the licensee to access an authorized set of 3D object files using the communication path, the 3D replication key for the replication rights of the licensee to replicate the authorized set 3D object files;
list, using an interface at the licensee device, the authorized 3D object files for selection of a subset of 3D object files, the 3D replication key corresponding to replication rights of the licensee to access the authorized set of 3D object files;
verify of capabilities of the licensee to access and replicate the selected 3D object files according to licensor replication requirements;
protect the selected 3D object files on the licensee's system using one or more encryption keys, the one or more encryption keys being different than the 3D replication key, the 3D object files comprising one or more encrypted 3D object files;
connect to one or more 3D replication components as authorized by the licensor device to create the authorized 3D replication system;
use the authorized 3D replication system and the 3D replication software to track and report replication activities of the one or more 3D replication components;
monitor software program access of the plurality of selected 3D object files, wherein the 3D replication key is not used to perform decryption of the one or more 3D object files;
permit limited access by the licensee device to the plurality of selected one or more 3D object files as allowed by the licensor to initiate a replication process of the selected one or more 3D object files; and
upon any of the plurality of selected one or more 3D object files being accessed, modified or submitted for the replication process, transmit the real-time feedback commands to the licensor device related to monitored activity on the plurality of selected one or more 3D object files.

* * * * *